(12) United States Patent
Roy

(10) Patent No.: US 11,481,092 B2
(45) Date of Patent: Oct. 25, 2022

(54) INTELLIGENT WORKSPACE

(71) Applicant: NB Ventures, Inc., Clark, NJ (US)

(72) Inventor: Kabir Roy, Mumbai (IN)

(73) Assignee: GLOBAL EPROCURE, Clark, NJ (US)

( * ) Notice: Subject to any disclaimer, the term of this patent is extended or adjusted under 35 U.S.C. 154(b) by 647 days.

(21) Appl. No.: 15/166,680

(22) Filed: May 27, 2016

(65) Prior Publication Data

US 2017/0344895 A1    Nov. 30, 2017

(51) Int. Cl.
*G06F 3/0484* (2022.01)
*G06N 20/00* (2019.01)

(52) U.S. Cl.
CPC ........... *G06F 3/0484* (2013.01); *G06N 20/00* (2019.01)

(58) Field of Classification Search
CPC ....... G06F 3/0484; G06N 7/005; G06N 20/00
See application file for complete search history.

(56) References Cited

U.S. PATENT DOCUMENTS

| | | | | |
|---|---|---|---|---|
| 8,126,868 | B1* | 2/2012 | Vincent | G06F 16/972 707/708 |
| 2002/0130899 | A1* | 9/2002 | Ryan | G06Q 30/06 715/738 |
| 2007/0067269 | A1* | 3/2007 | Rudge | G06F 9/451 |
| 2008/0229199 | A1* | 9/2008 | Richardson | G06F 16/90 715/714 |
| 2010/0248688 | A1* | 9/2010 | Teng | H04M 1/67 455/411 |
| 2014/0068454 | A1* | 3/2014 | Hirama | G06F 3/1271 715/744 |
| 2016/0062603 | A1* | 3/2016 | Halbedel | G06F 3/0482 715/762 |
| 2016/0360336 | A1* | 12/2016 | Gross | H04M 1/72583 |
| 2017/0255875 | A1* | 9/2017 | Chien | G06N 20/00 |
| 2017/0322679 | A1* | 11/2017 | Gordon | G06F 3/015 |
| 2017/0330195 | A1* | 11/2017 | Lange | G06F 3/0486 |

* cited by examiner

*Primary Examiner* — Kamran Afshar
*Assistant Examiner* — Ryan C Vaughn
(74) *Attorney, Agent, or Firm* — BrownWinick Law Firm; David Breiner

(57) ABSTRACT

An intelligent workspace is disclosed. In example embodiments, methods and systems for operating the intelligent workspace on an application of a computing device are disclosed. The workspace includes various tools utilizing user behavioral analytics and user role information for dynamically operating on applications like procurement applications. The systems and methods reduce operational time of the user and enhance the user experience.

29 Claims, 22 Drawing Sheets

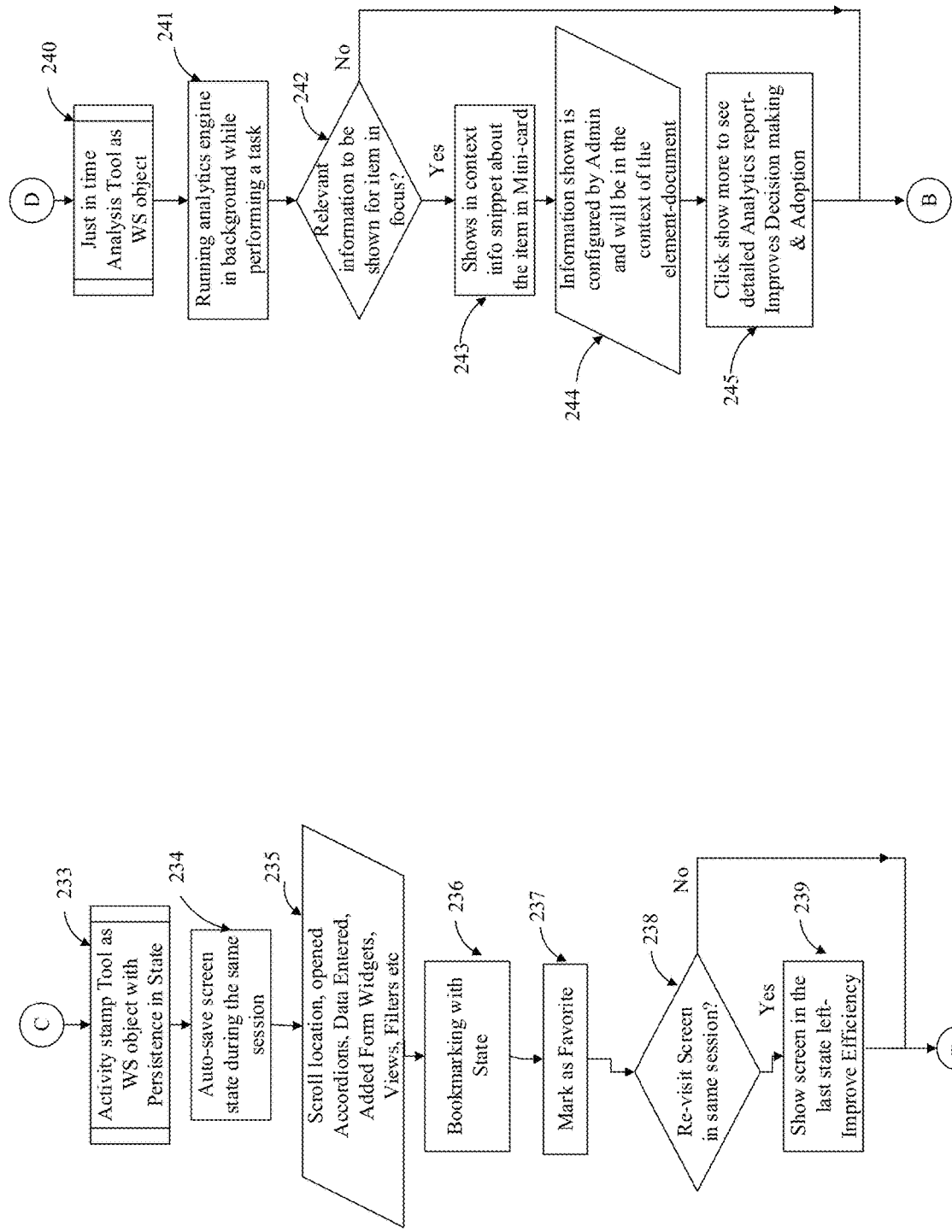

500

EMILY'S WORKSPACE

← 📋 CREATE RFX

○—◉—○—○—○—○—○—○—○—⊕

> BASIC DETAILS

Event Name
_____

Event Type ▸
_____

Category
Air Travel, Baggage Fees +2 more

Business Unit
GEP Hyderabad +4 More

Choose Region

☐ Sealed Event ⓘ    ☐ Training Event ⓘ    ☐ Confidential Event ⓘ

☑ Multi Currency Event ⓘ
(View Exchange Rate)

> QUESTIONNAIRE

> PRICESHEET

MODIFY RFX SETTINGS                SAVE AS DRAFT    SUBMIT

FIG. 5A

EMILY'S WORKSPACE

← 🗓 CREATE RFX

∨ BASIC DETAILS

Event Name _____

Event Type ▸ _____ | Currency Type ✕ ▾ |

Category
Air Travel, Baggage Fees +2 more ⓘ

Business Unit
GEP Hyderabad +4 More ⓘ

☐ Sealed Event ⓘ    ☐ Training Event ⓘ

☑ Multi Currency Event ⓘ
(View Exchange Rate)

| Event name |
| Event Type |
| Currency Type ✕ |
| Category |
| Business Unit |
| Region |

∨ QUESTIONNAIRE

∨ PRICESHEET

MODIFY RFX SETTINGS        SAVE AS DRAFT    SUBMIT

INTELLIGENT WORKSPACE

BACKGROUND

1. Technical Field

The present invention relates generally to a workspace. More particularly, the invention relates to systems and methods with an intelligent workspace for operating on applications of a computing device.

2. Description of the Prior Art

Computing devices, applications operating on these devices, and the user interfaces interacting with these applications have evolved over the years from complex systems to more user friendly systems providing improved user experience. However, every domain presents different challenges depending upon the nature of the applications. Procurement as a domain is a complicated space where organizations need to get high efficiency and value out of the platform that they deploy for their employees to work on. The platform is not only expected to cover the entire complexity of workflow of a document from Procure to Pay (P2P) or Source to Pay (S2P) but also handle organizational rules and logics to trigger specific timely actions and enhance savings for the organizations across global locations with users from various demographics using the same platform. The platform is expected to handle high scale as well as provide ease of use which is a tricky problem to achieve, not to mention the huge training and support cost to learn and use the platform in the intended manner.

Most of the existing systems are non-flexible and provide a set way of performing an activity for all sets of users no matter what level of maturity they are (novice, intermediate or expert) or what role they belong to (requester, approver, buyer, analyst, category manager, so on and so forth). This rigid way of imposing a particular way of working designed by Subject Matter Experts (SMEs), requires employees of an organization to learn the system's task flows and remember them to achieve a particular job. Most of the time it is very specific to what role they are playing. The existing systems also expose all features and functionalities and the entire rigid navigation to the end-user expecting the end user to find his or her way to the intended task the end user wants to achieve.

An organization that intends to make its employees work with these type of systems often ends up spending a lot of amount in training and roll-out management of the system, often exclusive of the support needed if users get stuck. Every time there is a change or enhancement in the system the user needs to unlearn and learn things back again thus impacting productivity and reducing efficiency for a certain period until they completely adopt the system and then the cycle starts again.

Interaction with computing devices through a Graphical User Interface (GUI) also plays a significant role in accomplishing tasks efficiently. The graphical user interface interacting with the existing systems generally includes fields in which the user may enter data and fields in which data may be presented. In some instances, fields may perform both tasks. For example, a field may include default data that the user may edit. Such fields may include user interface elements, such as text fields, combination (combo) boxes, buttons (radio, check, or generic buttons, etc.) and non-editable labels, etc.

Further, there are organizations that may want to customize the user interface of their applications for their employees to reflect their unique business needs and brands. Many existing applications allow a user to customize the user interface in a limited way, i.e., the user may be able to change certain aspects of the user interface as per preference.

Alternately, the organization's administrator may wish to remove user interface elements that are not pertinent to the way their organization operates, or add user interface elements. in the existing systems an administrator may be responsible for customizing the user interface, i.e., the administrator controls or dictates to an end user how a user interface will look and operate.

The process of activating, configuring, and optimizing desired application in a workspace to view a user's preferred arrangement of the application is very tedious and time consuming. It is difficult and expensive to customize each user interface screen individually. Further, the existing systems and methods consume lot of time for processing a task.

U.S. Pat. No. 9,134,888 provides user interface creation support system, user interface creation support method, and non-transitory storage medium for designing user interface systems. However, the existing systems do not consider dynamically changing user behavioral data, the organizational requirements and the time constraints for executing tasks. Further, the existing systems do not provide existing systems do not provide time saving, user-friendly solutions to the requirements of a particular user.

Accordingly, there is a need in the art for improved systems and methods to interact with applications on a computing device through intelligent means.

SUMMARY

An embodiment of the present invention discloses a system with an intelligent workspace for operating on an application of a computing device. The system includes: 1) a network interface configured to communicate with at least one server; and 2) an electronic user interface configured to display the intelligent workspace on the computing device and receive inputs from a user. The electronic user interface is a self-evolving user interface configured to receive inputs from a user through voice commands, gesture controls, mouse, touch pads or keyboards. The system further includes at least one user activity database coupled to the at least one server for storing real time user activity data obtained by identifying and tracking activity of the user in the workspace, and at least one user profile database coupled to the at least one server for storing user profile data containing information about access, terms of usage and role of the user when operating on the application. The system also provides an artificial intelligence (AI) engine for predicting a set of actions the user may want to perform based on the user activity data and the user profile data, wherein the AI engine reconfigures the workspace dynamically to provide a plurality of optimization and navigation options to the user based on the predicted actions, and a self-learning data processor configured to run the application based on the reconfigured workspace, wherein the data processor is coupled to the artificial intelligence engine for processing the predicted actions and a plurality of selected optimization and navigation options to reduce operational time of the user and provide enhanced user experience.

In an example embodiment, the invention provides a method for operating with an intelligent workspace on an application of a computing device. The method includes the steps of displaying the intelligent workspace on a display of the computing device, receiving inputs from a user through an electronic user interface, tracking activity of the user in the workspace to identify and store real time user activity data in at least one user activity database, and fetching user profile data from a user profile database, wherein the user profile data provides information about access, terms of usage and role of the user when operating on the application. The method further comprises the steps of predicting by an artificial intelligence (AI) engine a set of actions based on the user activity data and the user profile data that the user may want to perform in the application, and reconfiguring the workspace dynamically to provide a plurality of optimization and navigation options to the user based on the predicted actions, wherein a self-learning data processor coupled to the AI engine runs the application with the reconfigured workspace to process the predicted actions and the plurality of optimization and navigation options for reducing operational time of the user and providing enhanced user experience.

An example embodiment of the present invention provides a computer program product for operating with an intelligent workspace on an application of a computing device with memory. In this non-limiting example embodiment, the product comprises a computer readable storage medium readable by a self-learning processor. The computer readable storage medium may also store instructions for execution by the self-learning processor to perform the method for operating with an intelligent workspace on an application of a computing device.

In an advantageous aspect, the present invention caters an experience that is streamlined to a user's focus area and tweaks itself by learning from the user's behavior. The artificial intelligence (AI) engine of the present invention caters to certain essential elements of a user's activity, such as identifying the intent and the entity on which an action is performed by the user for accomplishing tasks.

An advantageous aspect the workspace of the present invention solves the problem of complex taskflows by introducing flexibility, improving efficiency and reducing learnability requirement of an end user using a system. The training cost may be relatively low or even zero as the system has self-learning algorithms and devices that utilize artificial intelligence to reduce the operational time of the user. The workspace of the present invention is advantageous in providing a faster way of reaching intended documents, and entities. It provides an aesthetically richer user experience—psychological stickiness, encouraging willingness to work and return to the system.

BRIEF DESCRIPTION OF THE DRAWINGS

The disclosure will be better understood when consideration is given to the drawings and the detailed description which follows. Such description makes reference to the annexed drawings wherein:

FIGS. 2A-2D are flowcharts depicting a method for operating with an intelligent workspace on an application of a computing device in accordance with an embodiment of the invention.

FIGS. 5A-5B are schematic representations of a widget tool of the intelligent workspace for interacting with the self-evolving user interface in accordance with an embodiment of the invention.

FIGS. 7A-7B are schematic representations of a One Nav+ tool of the intelligent workspace for interacting with the self-evolving user interface in accordance with an embodiment of the invention.

FIGS. 8A-8C are schematic representation of a JIT A Cards tool of the intelligent workspace for interacting with the self-evolving user interface in accordance with an embodiment of the invention.

DETAILED DESCRIPTION

Figure 1:
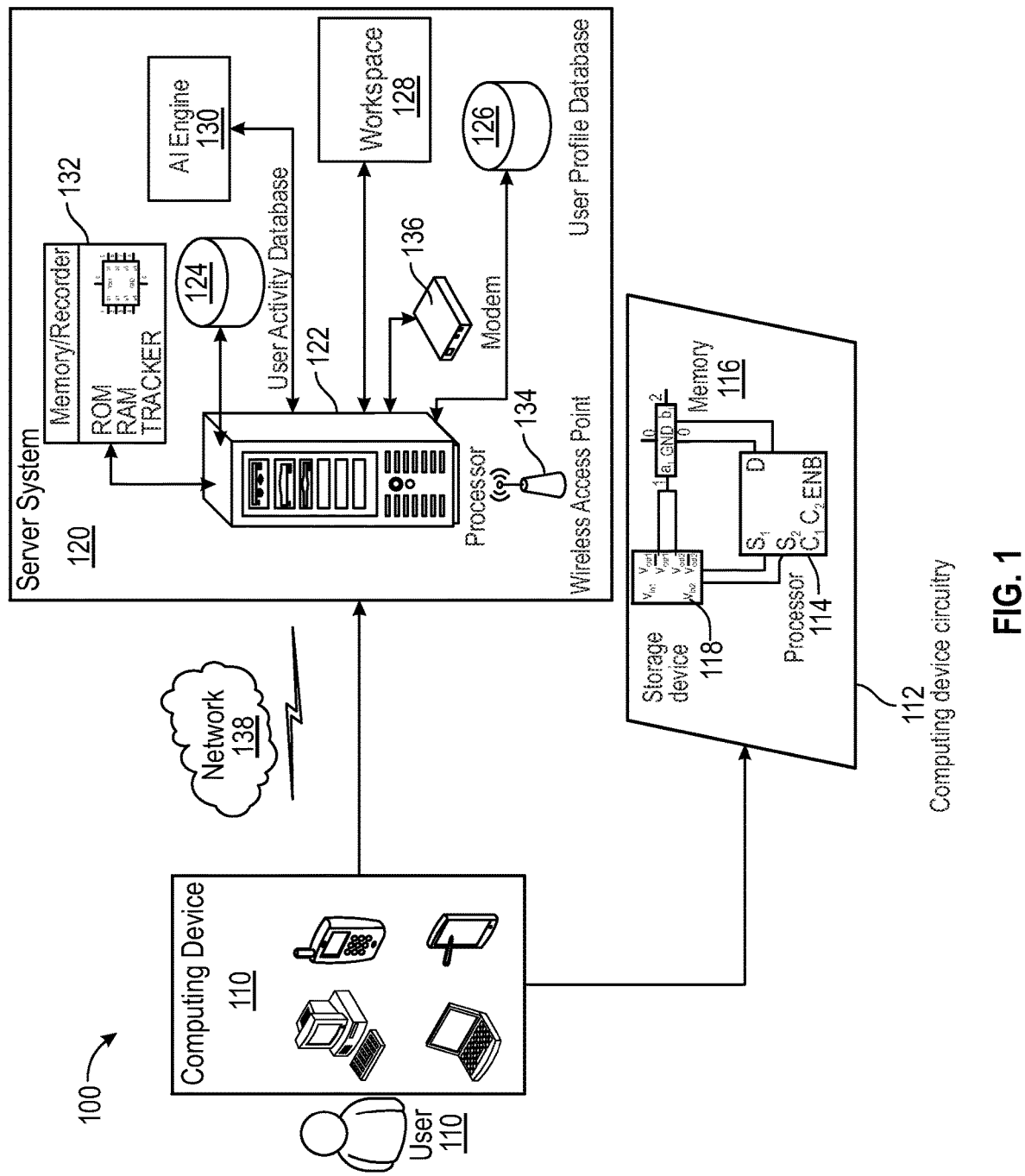
FIG. 1 is a view of a system with intelligent workspace for operating on an application of a computing device in accordance with an embodiment of the invention.

Described herein are the various embodiments of the present invention, which include a method and a system that reduce the operational time of working on an application of a computing device by using an intelligent workspace that enables auto selection of workflows, auto navigation options based on user profile data and user activity data including frequency of usage, information about paths, access duration, and the user's preferred location on the display of a user interface. The system employs a sophisticated and strong AI engine that has the ability to learn and evolve over time and communicate relevant information to a self-learning data processor by receiving inputs from a user via a self-evolving user interface for processing the information through an intelligent workspace. The entire application is available to a user for working, however, the artificial intelligence engine reduces the process time by suggesting optimized workflow options to the user and unless a request to modify the options is made, the system automatically processes the workflows, thereby reducing the process time. The user activity data are mapped with the user profile data to correlate the requirement of the user and the behavioral pattern of the user for suggesting and implementing workflow options in the workspace on the computing device.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "identifiers," "tags," or "screen," "film" and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit the various embodiments including the example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method with an intelligent workspace for operating on an application of a computing device to reduce operational time of a user and provide enhanced user experience while working on many applications including but not limited to a procurement application.

FIG. 1 is a view of a system 100 with an intelligent workspace for operating on an application of a computing device in accordance with example embodiments.

As shown in FIG. 1, the system 100 includes a computing device 110, and a server system 120 communicating with the computing device 110 through a network interface for operating on an application.

In at least one non-limiting example embodiment, the computing device 110 may include computing device circuitry 112 as shown in FIG. 1.

The example embodiment of FIG. 1 shows an example of a computer device/mobile computing device 110, which may be used to implement the processes described herein, including the mobile-side and server-side processes for transferring user activity data and user profile data from a mobile device to a computer.

The computing devices of the present invention are intended to represent various forms of digital computers, such as laptops, desktops, workstations, personal digital assistants, and other appropriate computers. Computing devices of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an example embodiment the computing device circuitry 112, as shown in FIG. 1, includes a processor 114, memory 116, and a storage device 118. The computing device circuitry 112 may further include a high-speed interface connected through buses for connecting to memory 116 and high-speed expansion ports, and a low speed interface connecting to low speed bus and storage device 118. Each of the components of the computing device circuitry 112 are interconnected using various busses and may be mounted on a common motherboard or in other manners as appropriate. The processor 114 can process instructions for execution within the computing device 110, including instructions stored in the memory 116 or on the storage devices 118 to display graphical information for a GUI on an external input/output device, such as display coupled to high speed interface. In other implementations, multiple processors and/or multiple busses may be used, as appropriate, along with multiple memories and types of memory. Also, multiple computing devices 110 may be connected, with each device providing portions of the necessary operations (e.g., as a server bank, a group of blade servers, or a multi-processor system).

The memory 116 stores information within the computing device 110. The memory 116 may be a volatile, a non-volatile memory or memory may also be another form of computer-readable medium, such as a magnetic or optical disk.

The storage device 118 is capable of providing mass storage for the computing device 110. In one implementation, the storage device 118 may be or contain a computer-readable medium, such as a floppy disk device, a hard disk device, an optical disk device, or a tape device, a flash memory or other similar solid state memory device, or an array of devices, including devices in a storage area network or other configurations.

The processor 114 can execute instructions within the computing device 110, including instructions stored in the memory 116. The processor 114 may be implemented as a chipset of chips that include separate and multiple analog and digital processors. The processor 114 may provide coordination of the other components of the device, such as controlling user interfaces, applications run by device, and wireless communication by device.

The processor 114 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to a user. The control interface may receive commands from a user and convert them for submission to the processor. In addition, an external interface may be provided in communication with processor 114, so as to enable near area communication of device with other devices. An external interface may provide, for example, for wired communication in some implementations, or for wireless communication in other implementations, and multiple interfaces may also be used.

In an embodiment the server system 120 of the invention may include various servers for communicating and processing data across the network. The servers include but are not limited to a content management server, application server, directory server, database server, mobile information server and a real-time communication server.

In an embodiment as shown in FIG. 1, the server system 120 includes a processor 122, a user activity database 124, a user profile database 126, a workspace 128, an artificial intelligence engine 130, a memory module 132, a wireless access point 134 for communicating with mobile devices, and a modem 136 for encoding and decoding digital information containing user activity data and user profile data.

The computing device 110 may communicate with the server system wirelessly through communication interface, which may include digital signal processing circuitry. In addition, a GPS (Global Positioning System) receiver may provide additional navigation- and location-related wireless data to device, which may be used as appropriate by applications running on device.

The computing device 110 may be implemented in a number of different forms, for example, as a smartphone, computer, personal digital assistant, or other similar devices.

Figure 2A:
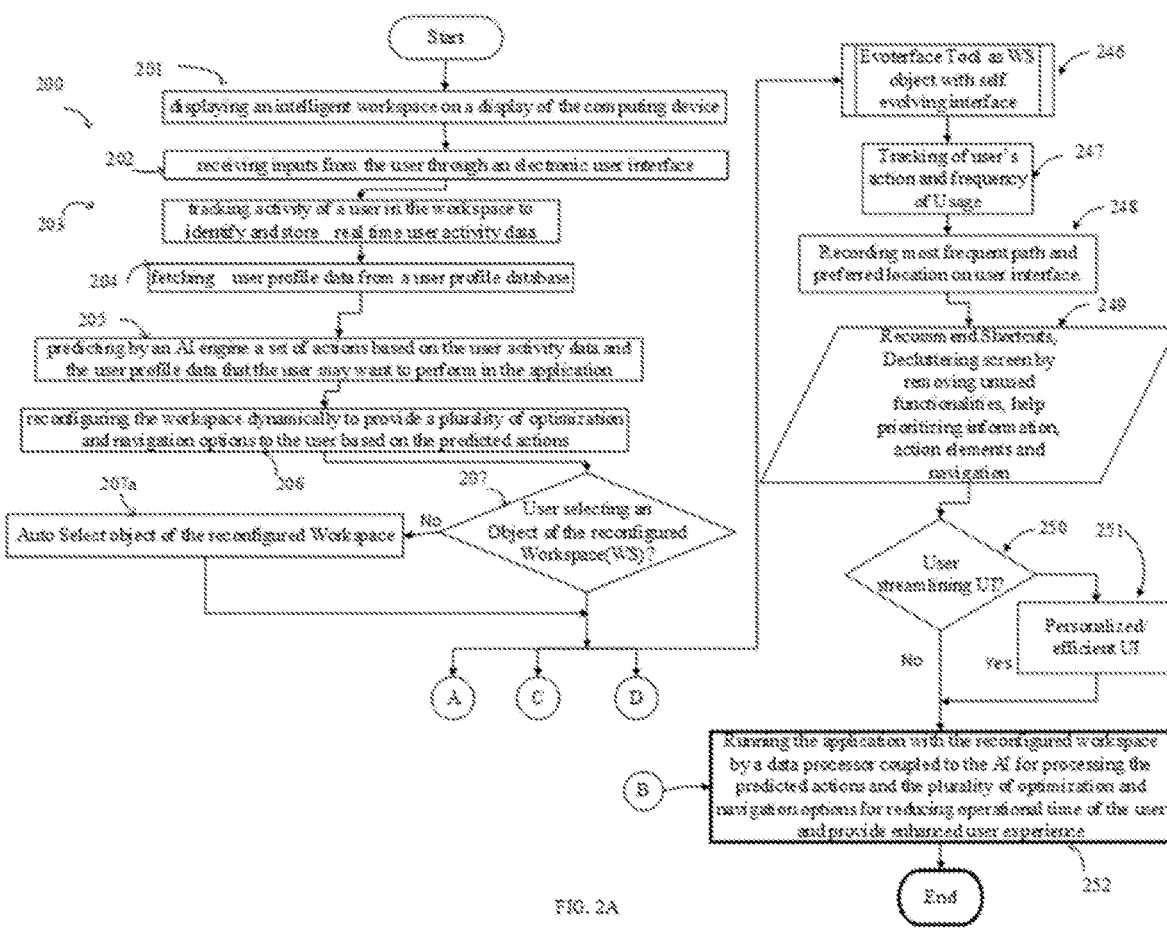

In an embodiment of the present invention a method 200 for operating with an intelligent workspace is provided as shown in FIGS. 2A-2D. The method comprises the step 201 of displaying an intelligent workspace on a display of the computing device as shown in FIG. 2A. In step 202 user inputs are received from the user through the electronic user interface. In step 203 real time user activity in the workspace is tracked to identify and store real time user activity data in at least one user activity database 124. In step 204 user profile data are fetched from a user profile database 126. The user profile data may include information about access, terms of usage and role of the user when operating on the application. The method includes the step 205 of predicting, by an artificial intelligence (AI) engine, a set of actions, based on the user activity data and the user profile data, that the user may want to perform in the application. In a non-limiting example, the AI engine maps the user profile data and user behavior data that includes the user's preferred locations on the electronic user interface by analyzing the user's intent and actions based on a data reciprocity developed between the artificial intelligence engine, the workspace, the user activity database and the user profile database. The method includes the step 206 of reconfiguring the workspace dynamically to provide a plurality of optimization and navigation options to the user based on the predicted actions. In step 207 a user selects an object of the reconfigured workspace to work on. If the user opts not to select the object, then the system may auto select the object of the reconfigured workspace in step 207a. Once an object is selected either by the user or auto selection by the system, the method includes the step of operationalizing the selected object.

Figure 2B:
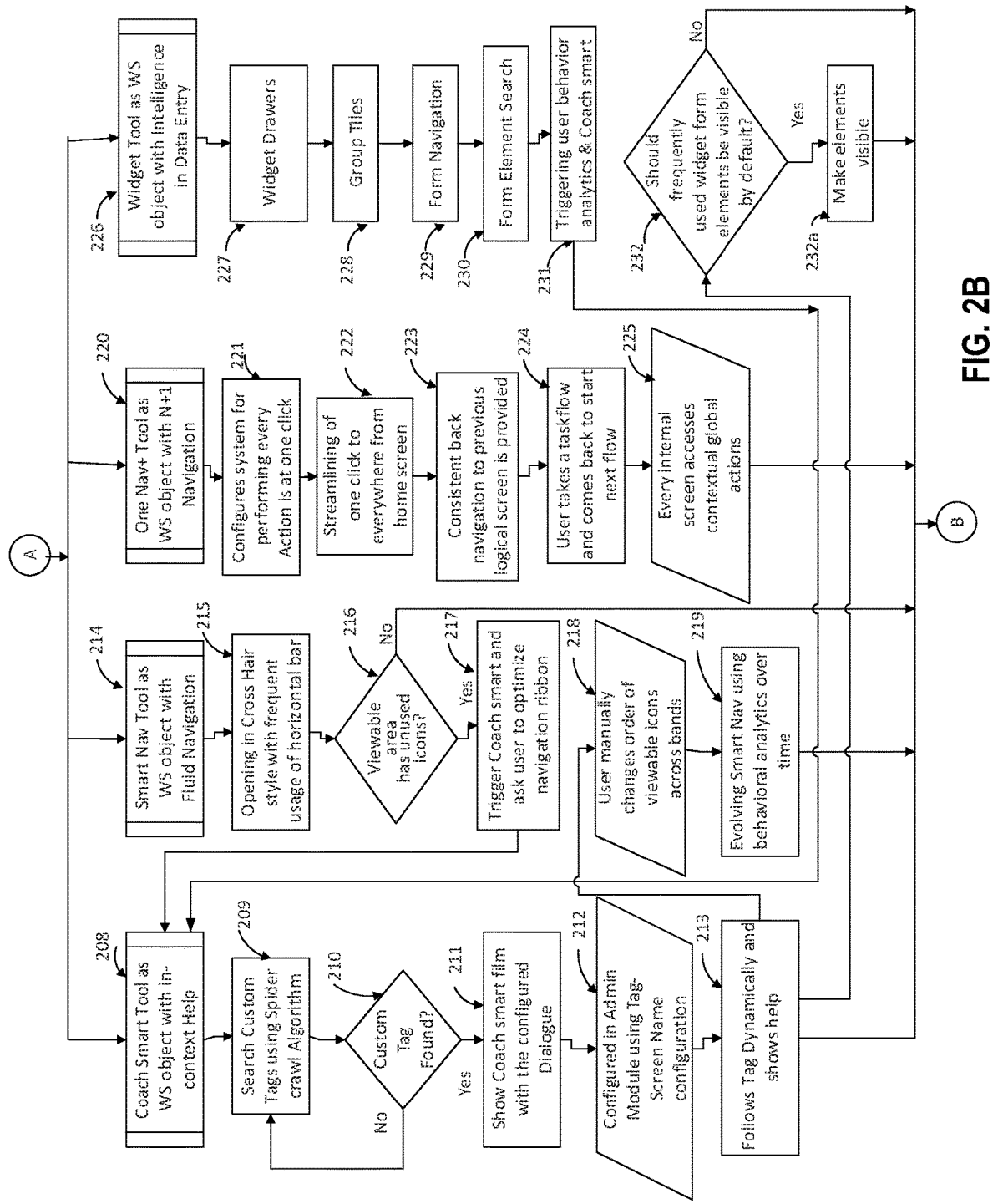

Referring to FIG. 2B, if the selected object is the coach smart tool with in-context help engine in step 208 then, the system searches custom tags using spider crawl algorithm in 209. The method includes the step 210 of checking if the custom tag is found. If not, the system runs the spider crawl algorithm again. If found, then in 211 system shows a coach smart film/graphic control element (GCE) screen with configured dialogue. The method includes the step 212 of configuring the screen in admin module using tag screen-name configuration. In step 213 the system follows a tag dynamically and shows help.

If the selected object is a smart nav tool with fluid navigation in step 214, then, in 215, the tool is opened in cross hair style with frequency usage of horizontal bar. In 216, the viewable area is checked for unused icons. If not, then navigation option is not activated. If yes, then in 217 the coach smart tool is triggered and the user is asked to optimize navigation ribbon. In 218, the user manually changes the order of viewable icons across bands. Alternately, the change may be affected by the system automatically based on the user activity data. In 219, the smart nav tool keeps evolving based on user behavior analytics.

If the selected object is a One Nav+ tool with N+1 navigation in step 220, then in 221, the system is configured for performing every action in one click. In step 222, streamlining of one click is done to everywhere from the home screen. In 223, consistent back navigation to previous logical screen is provided. In 224, a user takes a task flow and comes back to start next flow and in 225, every internal screen accesses contextual global actions.

If the selected object is a Widget tool with intelligence in data entry, as in step 226, then in step 227, widget drawers are provided and in 228 group tiles are provided. In step 229, a form navigation feature is provided, and in step 230, a form element search feature is provided in the widget tool. In step 231, coach smart and user behavior analytics is triggered to determine the frequently used widget form elements. In step 232, the system checks if the frequently used widget form elements should be visible by default, if yes, then in step 232a, making the elements visible, if no, then standard data entry provisions are used for working with the widget form tool.

Referring to FIG. 2C, if the selected object is activity stamp tool with persistence state as in step 233, then in step 234, auto-save screen state during the same session is performed. In step 235, scroll location, opened accordions, data entered, added form widgets, views, filters etc. are activated. In step 236, a screen is bookmarked with state and in step 237 the screen is marked as favorite. In step 238, checking if the user wants to revisit the screen in same session, if yes, then in step 239, the screen left in the last state is shown, which saves time and improves efficiency. If a user doesn't want to revisit the screen, then the application runs in the normal course.

Referring to FIG. 2D, if the selected object is just in time analysis tool, as in step 240, then in step 241 an analytics engine is run in the background while performing a task. In step 242, the system checks if the relevant information showed be shown for item in focus. If no, then the application runs in the normal course. If yes, then in step 243, in context info snippet about the item in mini-card is shown. In step 244, information shown is configured by Admin and will be in the context of the element-document. In step 245, user has the option of clicking show more tab to see detailed analytics report which improves decision making & adoption.

Referring to FIG. 2A, if the selected object is in step EvoTerface tool with self-evolving user interface, as in step 246, then in step 247, the user's action and frequency of usage are tracked. Step 248 illustrates recording most frequent path and preferred location on user interface. In step 249, recommending shortcuts, decluttering screen by removing unused functionalities, help prioritizing information, action elements and navigation are provided. Step 250 illustrates checking with user streamlines the user interface. If yes then, personalized/efficient UI is activated in step 251, otherwise the normal UI is functional.

In step 252, the application is run with the selected objects of the reconfigured workspace by a data processor coupled to the AI for processing the predicted actions and the plurality of optimization and navigation options for reducing operational time of the user and providing enhanced user experience.

In an exemplary embodiment relating to the workspace coachsmart tool, the invention provides a method for operating on an application using the coachsmart tool. The method includes the steps of creating at least one custom identifier, appending the at least one custom identifier to at least one selected floating screen item, displaying a plurality of screen items on a display screen of the user, scanning the displayed screen items for identifying the at least one selected floating screen item and the at least one custom identifier, where the floating screen item can be identified even if it appears randomly on any display screen at any part of the application, processing information associated with the at least one custom identifier by a processor, wherein the information is the in-context help information obtained from a help database by the in-context help engine, loading a graphic control element (GCE) screen on top of the display screen, and displaying the information associated with the at least one custom identifier on the GCE screen as the in-context help information.

Figure 3A:
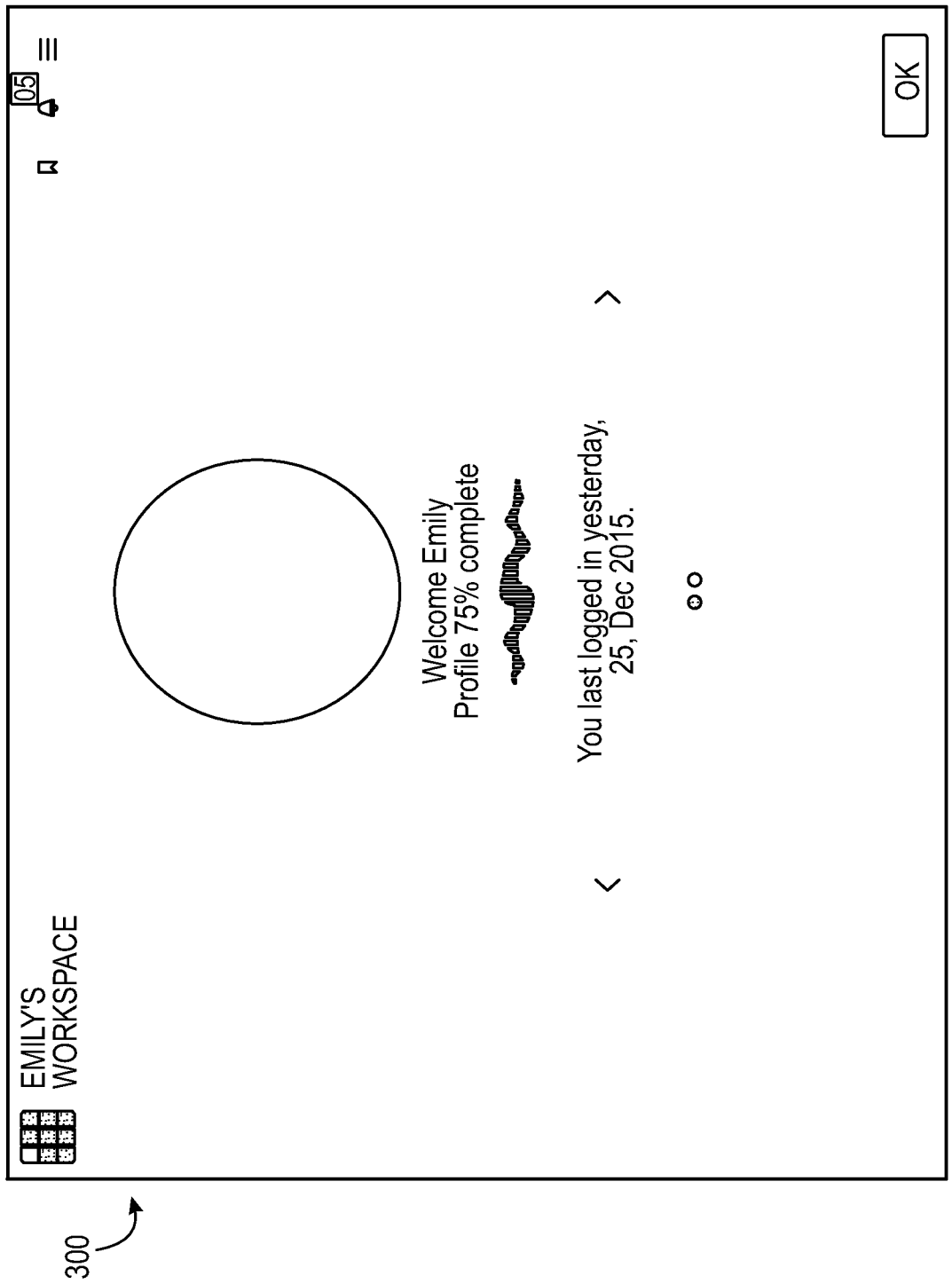
FIGS. 3A-3D are schematic representations of a coach smart tool of the intelligent workspace for interacting with a self-evolving user interface in accordance with an embodiment of the invention.

In an example embodiment, the intelligent workspace of the present invention includes a login screen 300 as shown in FIG. 3A.

Figure 3B:
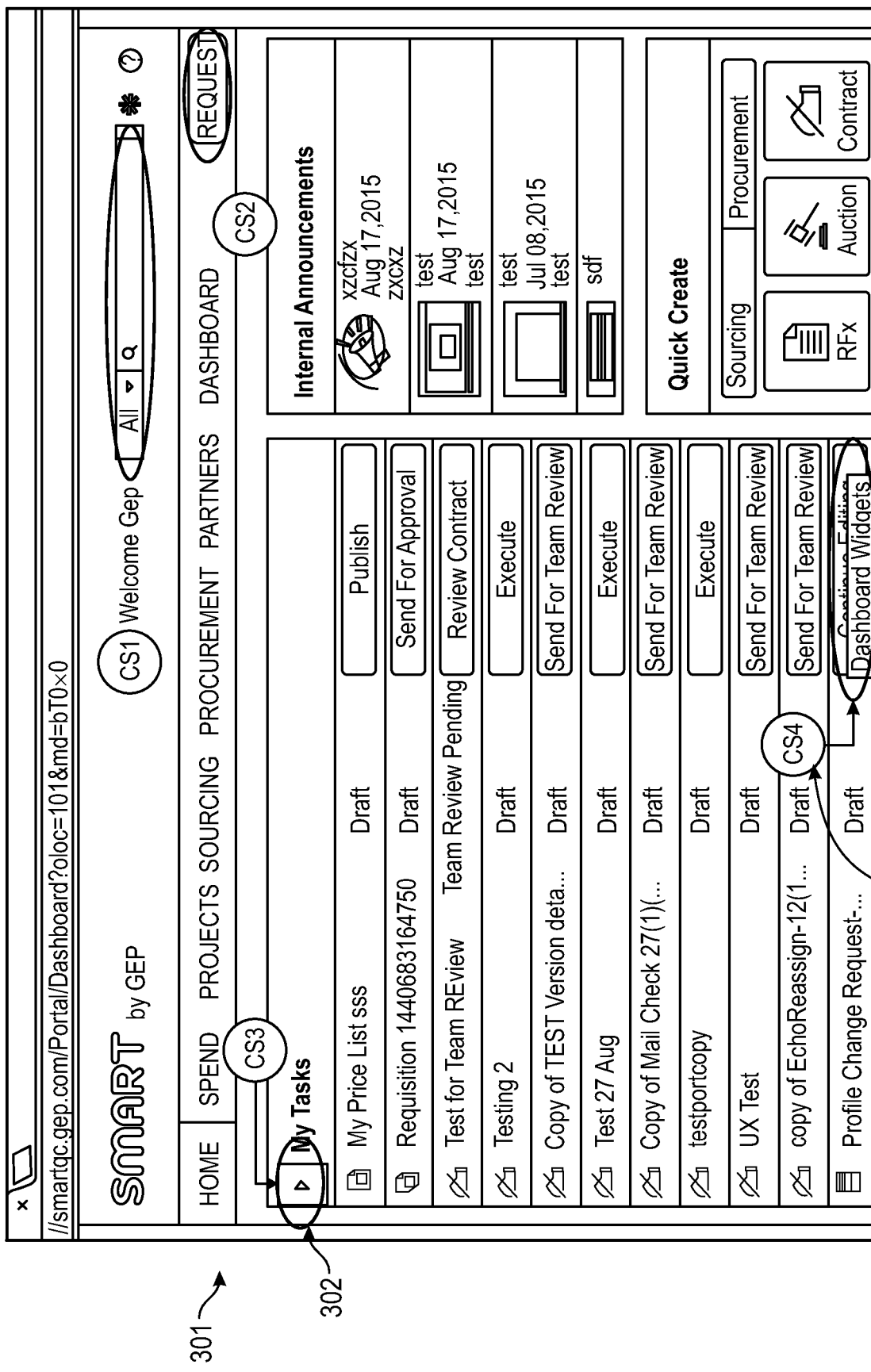
Figure 3C:
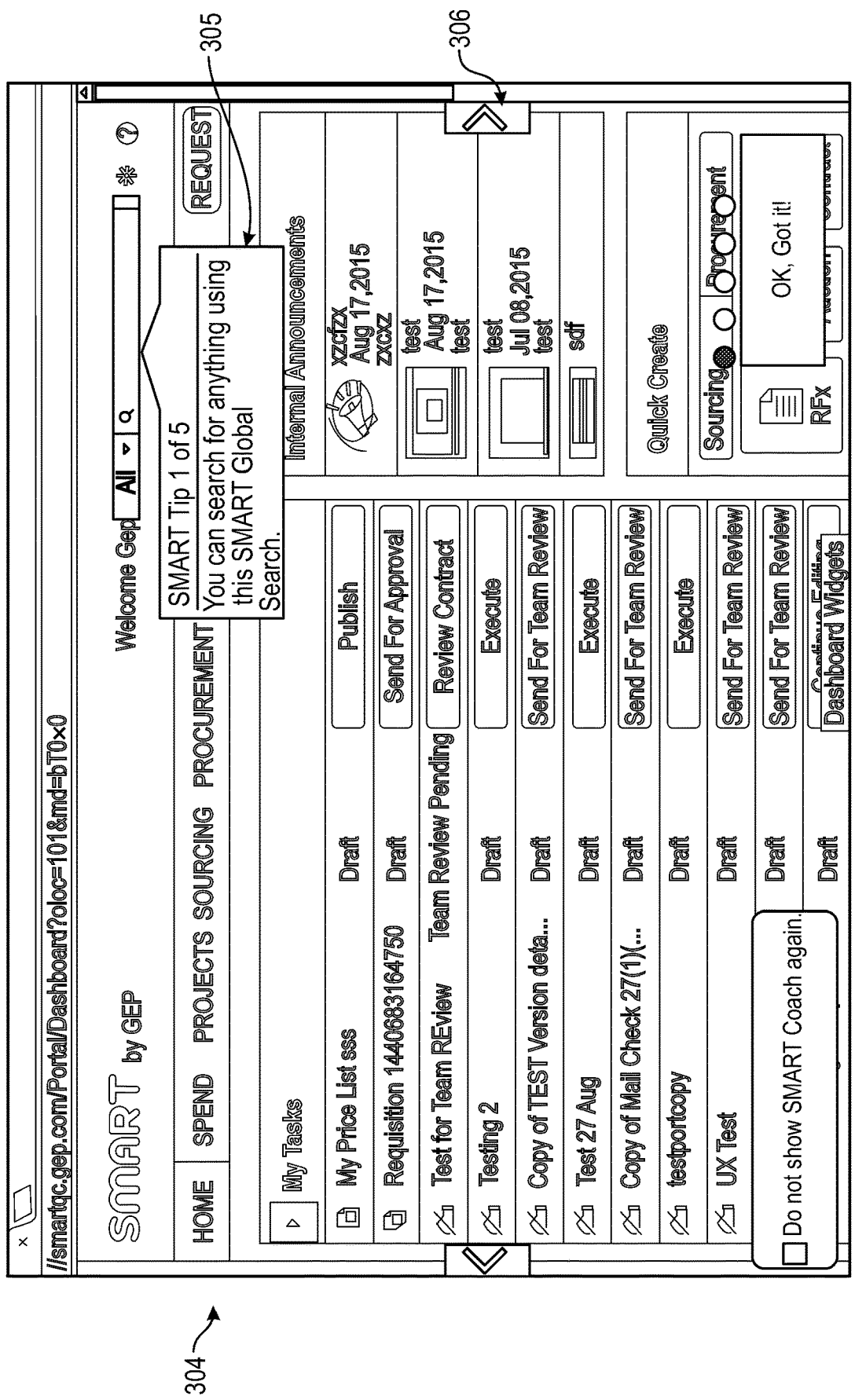
Figure 3D:
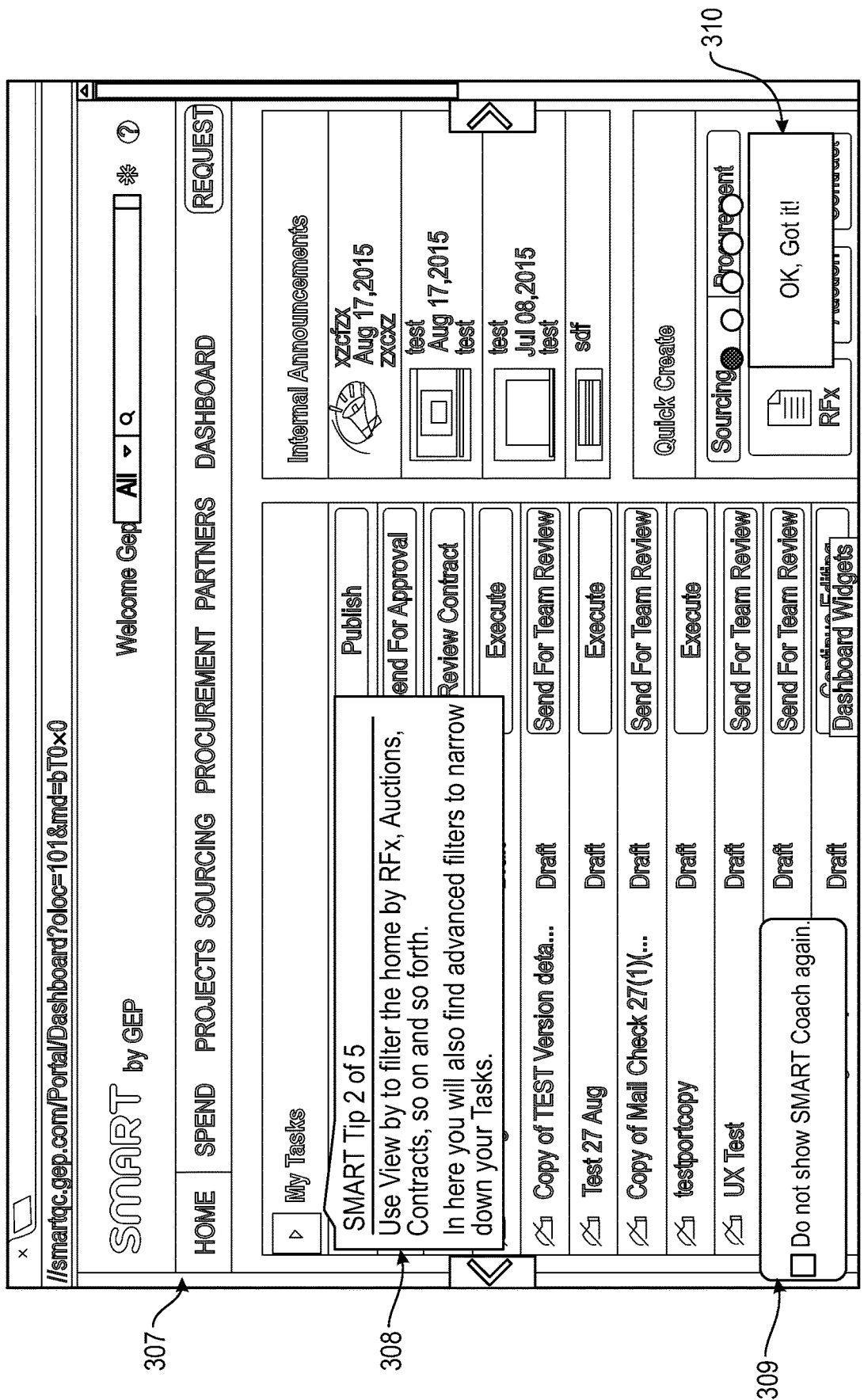

Referring to FIGS. 3B-3D, a coach smart tool is provided in accordance with an embodiment of the invention. The tool provides an intelligent in-context on-screen help engine that can be configured for any screen in an application like a procurement application platform for providing enhanced user experience and reduced operational time. It is agnostic of product versions, type and device. It is dynamic and configurable and has 2 sides of it, consumption and admin. It sits at a central location and can be pulled up to play on any platform. It is to be placed in multi-tenant Environment. Workspace will inject it through code and author the application using the Admin UI.

Every screen of the tool has various HTML components which create the screen elements. The coach smart tool includes a graphic control element (GCE) screen for displaying an in-context help information about a plurality of items appearing randomly in the application, wherein the information is provided by an in-context help engine configured for fetching the information from a help database. The system provides custom tags/custom identifiers like CS3 (302), CS4 (303) to on screen items on the screen 301 in the code the user may need help on as shown in FIG. 3B.

Referring to FIG. 3C, when a screen loads for the first time, the Coachsmart (CS) engine will scan the screen 304 to identify these tags/identifiers/coach mark. When it finds these tags, it loads the graphic control element (GCE)/Coach Mark Film, which is a translucent film, on top of this screen and displays the coach marks with help text (305) on it. When user clicks on the next arrow (306), it will show the next coach marks. The marks may be shown one-by-one as per the sequence configured on the system.

Referring to FIG. 3D, while presenting coach marks for a particular screen 307, the system can also decide to group multiple coach marks 308. There is a checkbox 309 at the bottom of this film which says "Do not show this again". Once this is checked, it will not show this screen ever automatically. user will have to invoke it again from help icon. There will be a "OK, Got It!" tab/button 310 as well which will close Coachsmart for the current screen only, but will appear again if the next screen is loaded. There will be a Previous/Next (311, 312) arrow as well to manually go to the next available Coach Mark. In an embodiment, the system is also configured for defining the slide time to load next coach mark automatically.

In an exemplary embodiment of the present invention, when the GCE/coach mark screen loads, it highlights the screen item it is showing description about. If the custom identifier for which coachsmart has been configured is at a different location in the next screen, the system is configured to ensure that the custom identifier/tag is maintained. Coachsmart engine automatically identifies the element next time and shows the appropriate coach mark text/help information associated with the custom identifier and highlights the screen item on the GCE screen for its new location.

In another exemplary embodiment, the Coachsmart can also be extended for connecting to Product Help Site, loading Help Videos in a separate pop up and showing "What's New?" in the newer versions.

In an embodiment, the coachsmart tool is configured by an admin module, using meta-tags like but not limited to tags such as "Name of the URL, Name of the screen, element tag identifier, min & max build number supported per URL, description: text area limited to 80 chars (no Tiny MCE), Enable Auto Load: in ms (will define if we want auto-scrolling to the next CS screen), order sequencing, copy help set to another URL, etc.

Figure 4A:
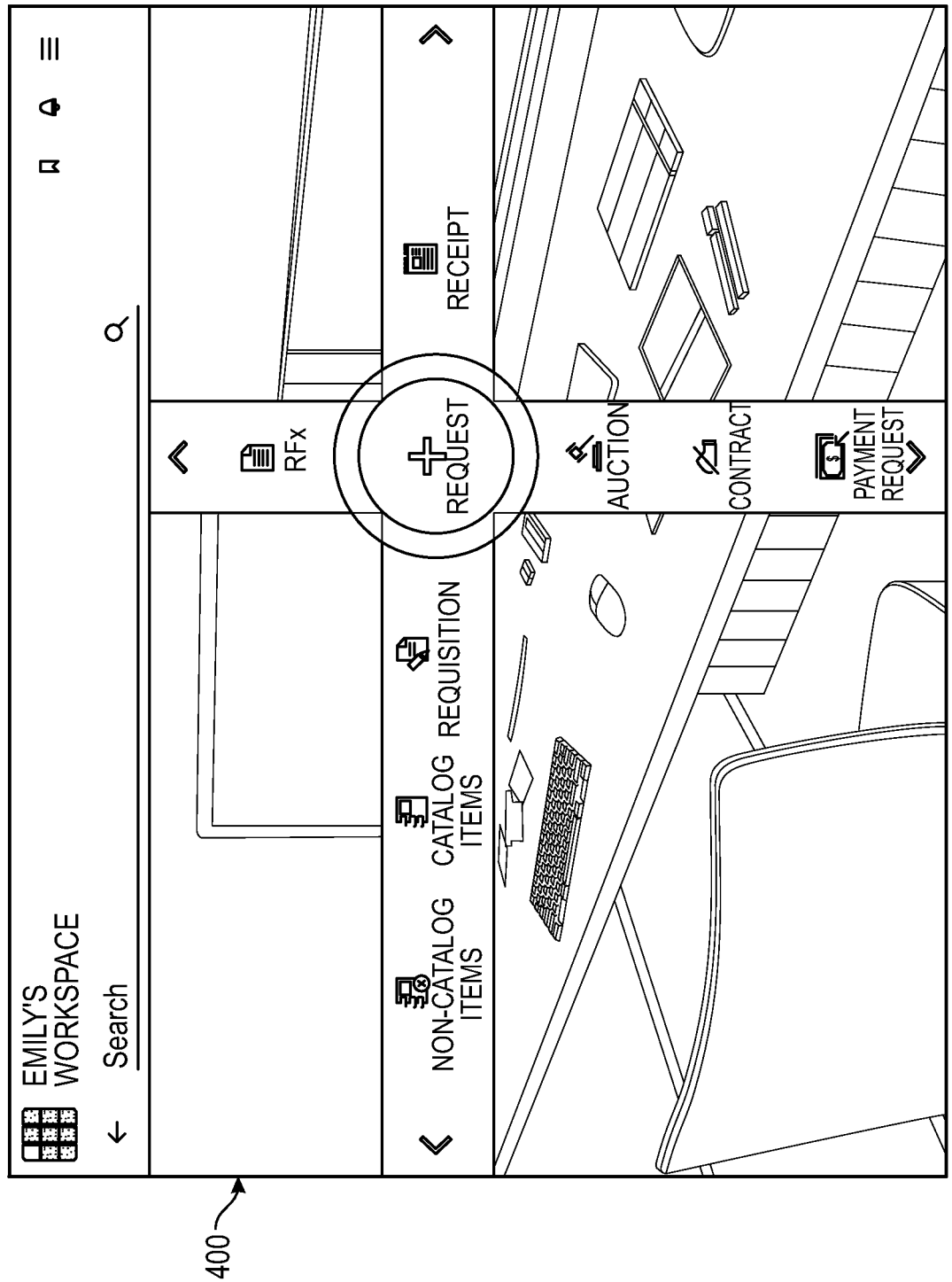
FIGS. 4A-4B are schematic representations of a smart nav tool of the intelligent workspace for interacting with the self-evolving user interface in accordance with an embodiment of the invention.
Figure 4B:
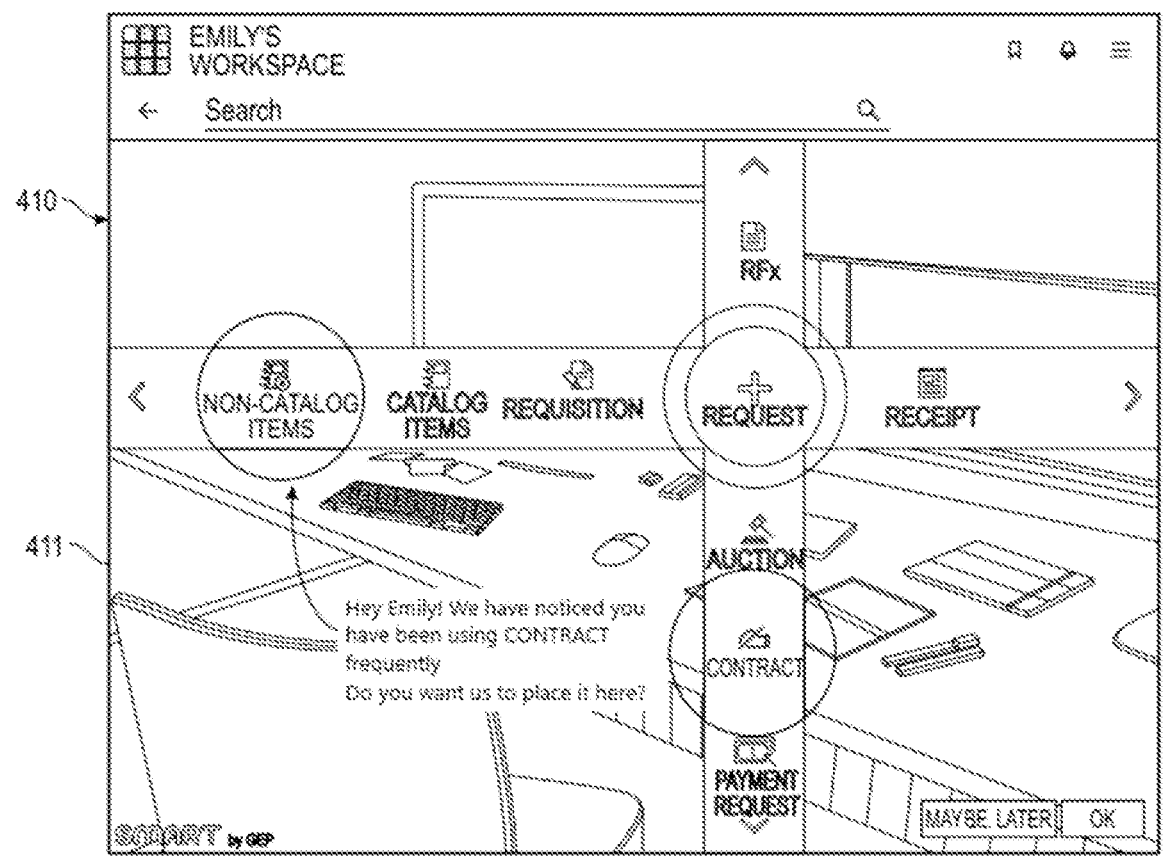

Referring to FIGS. 4A-4B, a smart nav tool is provided in accordance with an embodiment of the invention. The tool is a self-learning navigation tool configured for optimizing a navigation page of the application based on the real-time user activity data and user profile data. The tool enables tracking user's frequency of usage, frequently visited location, on the electronic interface by the user, and frequency paths to reach a particular activity point. The smart nav tool in conjunction with the EvoTerface tool which provides a self-evolving user interface enables intelligent functioning of the workspace to reduce operational time of the user and provide enhanced user experience. The intelligent workspace of the present invention is a platform with artificial intelligence that uses a self-learning algorithm and evolves based on user behavioral analytics. The system regularly keeps track of a user's actions and frequency of usage along with creating a mind-map of most frequented paths to reach a particular action point. Further, the frequently visited location on the electronic interface provides information about the user's preferred location on the interface for operating with a tool of the workspace. The smart nav tool's optimization and navigation options include options of creating shortcuts within the intelligent workspace, decluttering the workspace by removing or reshuffling un-used functionalities from the user's preferred location on the interface, prioritizing information cards, actions, and navigational elements for finding it easily next time.

In a related embodiment, the tool utilizes artificial intelligence (AI) based on a behavioral analytics algorithm. smart nav tool with the help of usage frequency pattern detects the most visited navigation path of a particular user working on an application like a procurement application. The tool either auto optimizes the way a user navigates to a screen or asks the user to bookmark the detected commonly used navigation path and store it as a shortcut for easy access.

Referring to FIG. 4A, the smart nav tool 400 provides an auto navigation feature based on the system configuration developed by the AI engine to predict the navigation path and the feature of the application that a user may want to operate on.

In an alternate embodiment, as shown in FIG. 4B, the smart nav tool 410 provides navigation features based on the input received from the user. The system asks the user if the user would like to interchange the location of a feature of the application in the workspace, like, for example, changing the location of non-catalog items and contracts from top left to down center and vice versa. If the user accepts the proposed interchange 411 then the system may change the location on the user interface to enable easy access to the user, the next time the user works on the application.

In an advantageous aspect, the smart nav tool is agnostic of product versions, development language, types and devices. This tool runs for each user in background and stores common navigation patterns. Based on a preset trigger, this will either auto-replace unused navigation elements or ask for user's permission to do so.

In another advantageous aspect, the smart nav tool solves the usability concerns of a user on having a pre-exiting non-flexible navigation system in existing applications. Ideally every user based on their role has different set of activities than they do on regular basis. The existing applications are designed and developed for a common usage scenario thus grouping together a large number of user roles with a common consistent navigation system which is not user specific or auto configured based on any intelligence. This raises a large number of issues for users who have to now follow a pre-set mechanism to navigate to the place where they actually need to work. For repetitive activities it becomes a cumbersome task-flow to try and reach the screens that actually matter. Smart nav with an auto configured feature reduces the number of clicks on its own without having to reengineer a separate application/tool.

The smart nav tool provides the users with a fluid navigation system. It is a self-learning optimization tool that improves performance based on a user's regular usage and uses an artificial intelligence engine to improve optimization. In an advantageous aspect, the smart nav tool can even be scaled up to multi-user usage patterns or be specific to a single user. The smart nav tool is configured to support a backend capability as well as an admin side from where the system can decide the frequency, trigger and features for which navigation items user may want smart nav to come into action.

Referring to FIGS. 5A-5B, a widget form tool (500, 510) is provided in accordance with an embodiment of the invention. The widget tool is configured for on-demand data entry, wherein a data form is formulated into widgets having meta-data attached to provide assistance for data entry. The widget form tool makes long forms short and easy to fill along with intelligence that will help the form respond to the user's behavior of using a coachsmart tool. A widget form tool is a way of formulating a data form into smaller chunks of widgets where each field will be a small intelligent element having meta-data attached to it like location (which group it goes into), mandatory/non-Mandatory, values being regularly punched in by the user, form completeness, validations, interactions and many more. The tool enhances efficiency of the user in filling long data entry forms by supporting it with AI of the system.

In an example embodiment, the widgetized forms of the tool provide features of widget drawer, group tiles, form navigation and form element search.

In a related embodiment, the widget drawer feature provides a place where all the form elements that are not required upfront can be kept tucked inside. The custom configuration for different users decides what goes inside a widget drawer. A user can add or remove any unwanted element from a widget drawer in just one click.

In another related embodiment, the whole widget form consists of multiple tiles of different logical groups known as group tiles. These groups can be decided by a simple configuration. Each group tile in the form has a widget drawer at the corner to add/remove form elements specific to that group. Each group tile is collapsible and drag and droppable. The collapsible feature allows the user to concentrate on only the current focus group and ignore the rest and also allows in form loading by loading only the opened tiles. The drag and drop feature in the tiles allows the user to restructure the order in which the user wants to view the form, if the user wants a particular tile at the top the user can do so by simply dragging a tile to the required position from its current position and the form will remember its new position and continue it forever.

In an exemplary embodiment, the widget forms are backed by behavioral analytics and AI, as widget forms will track which are the tiles the user is navigating to quite often based on scroll frequency, form navigation panel clicks and sequence of data filling in the form elements based on which using Coachsmart will prompt the user to restructure the form to optimally suit user's requirements so user can achieve user's work as user wants. In a related embodiment, the users can also change the grouping of group elements from one to another to suit their needs. Users can add or remove complete optional group tiles from a group tile widget drawer.

In an embodiment, the widget form tool provides a form navigation feature for easy navigation and data entry. The widget form is equipped with auto-scrolling to error fields, group tile navigation, i.e., jumping to the tile user may want to go to, back to top, keyboard tab enabled, form look ups, floating action footer band—to allow user to see upfront the expected action to be taken, floating contextual form top band—to allow user to keep form level top actions on top, floating right group navigation panel—to allow user to jump to any group directly, denote which level in the form the user is in focus and also allow user to add and/or remove additional groups if any.

In another embodiment, the widget tool provides a form element search feature enabling the user to search for any form element or group directly and add it as required. This feature is provided to promote usage of widget form hidden elements. Rather than discovering an element, a user can directly search and add an element. If user searches for an already added element, the system will show that in the search suggestion list and, on click, take the user to that element and highlight the same to improve findability.

Figure 6A:
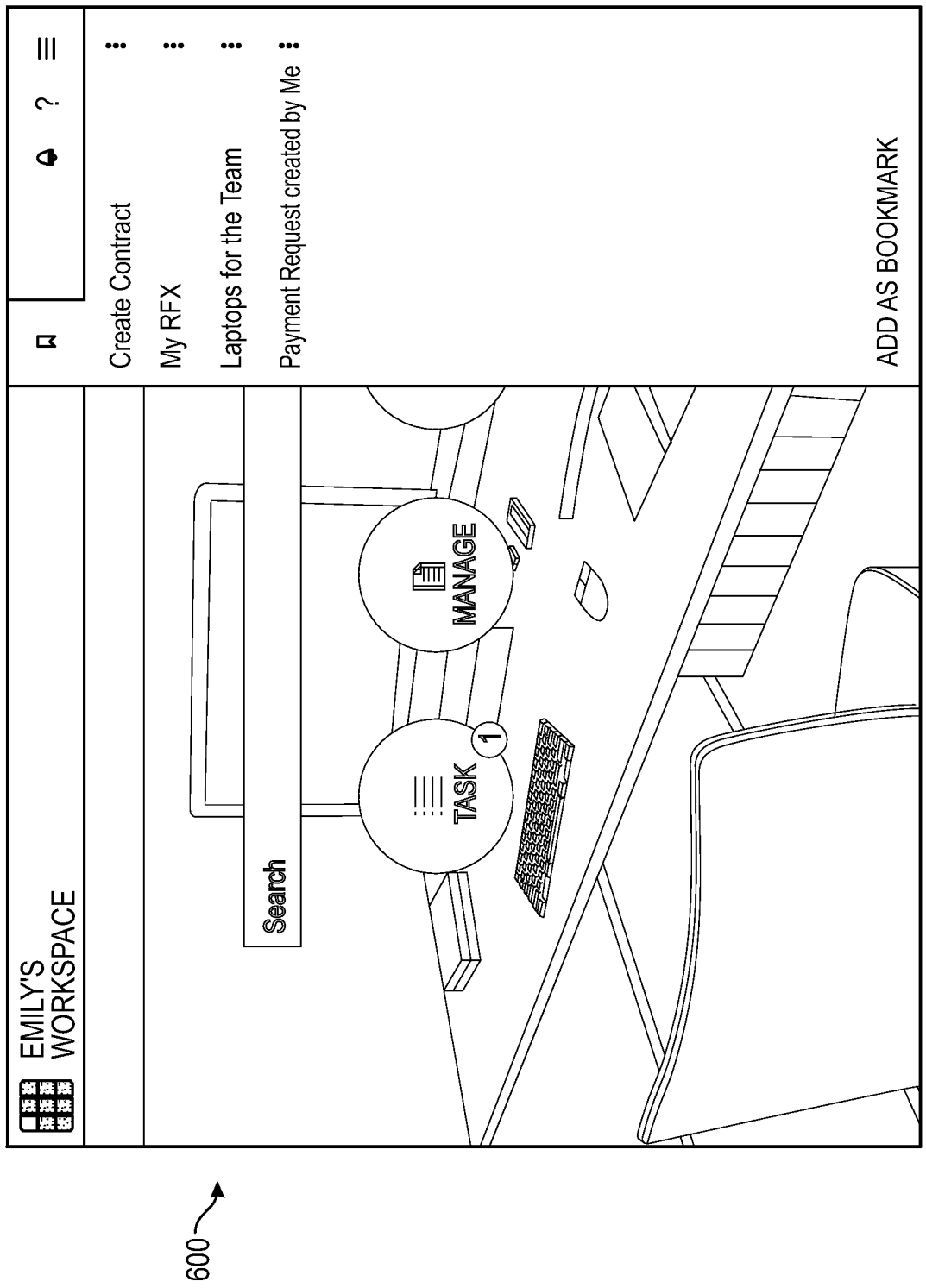
FIGS. 6A-6C are schematic representations of an activity stamp tool of the intelligent workspace for interacting with the self-evolving user interface in accordance with an embodiment of the invention.
Figure 6B:
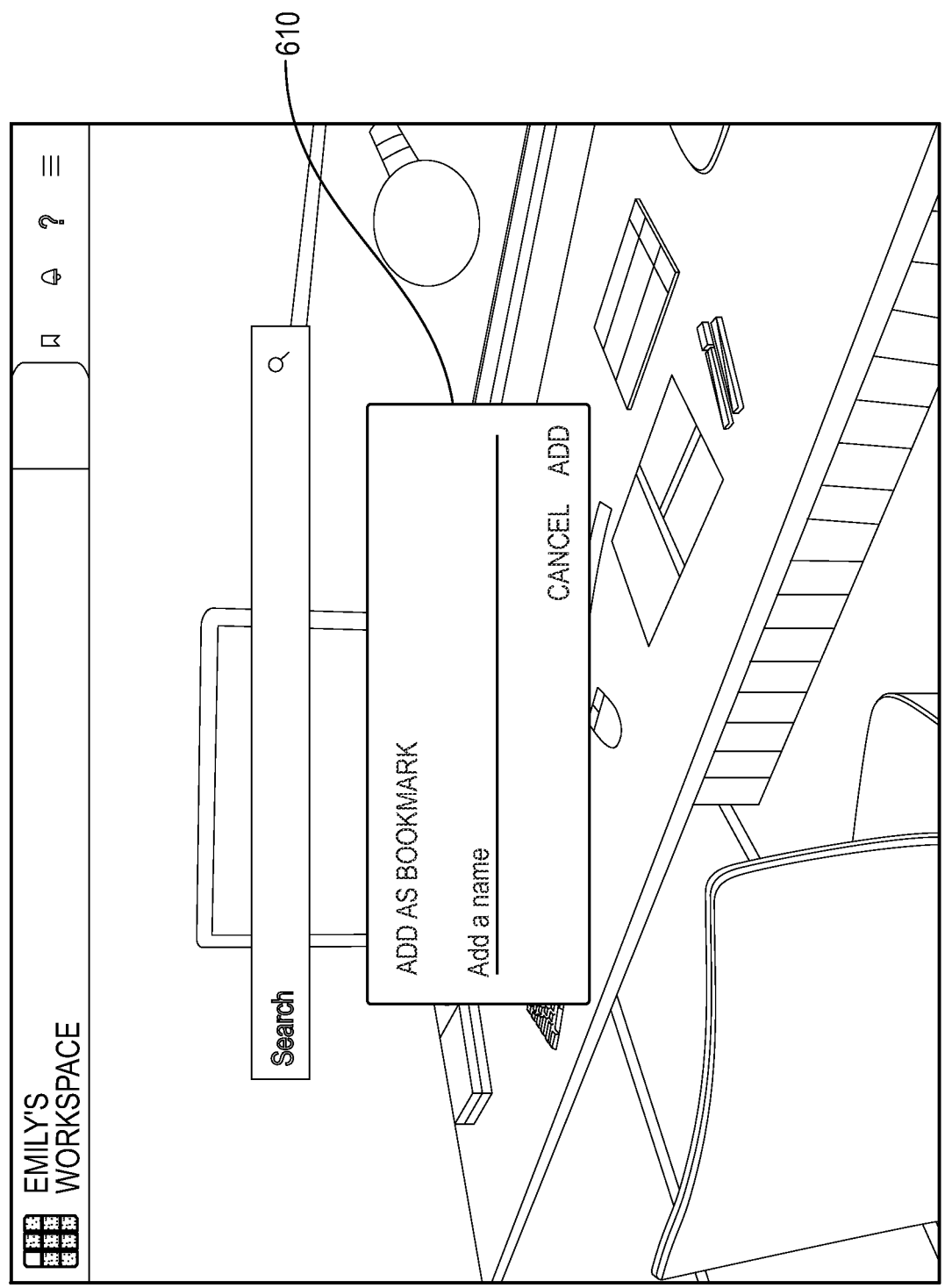
Figure 6C:
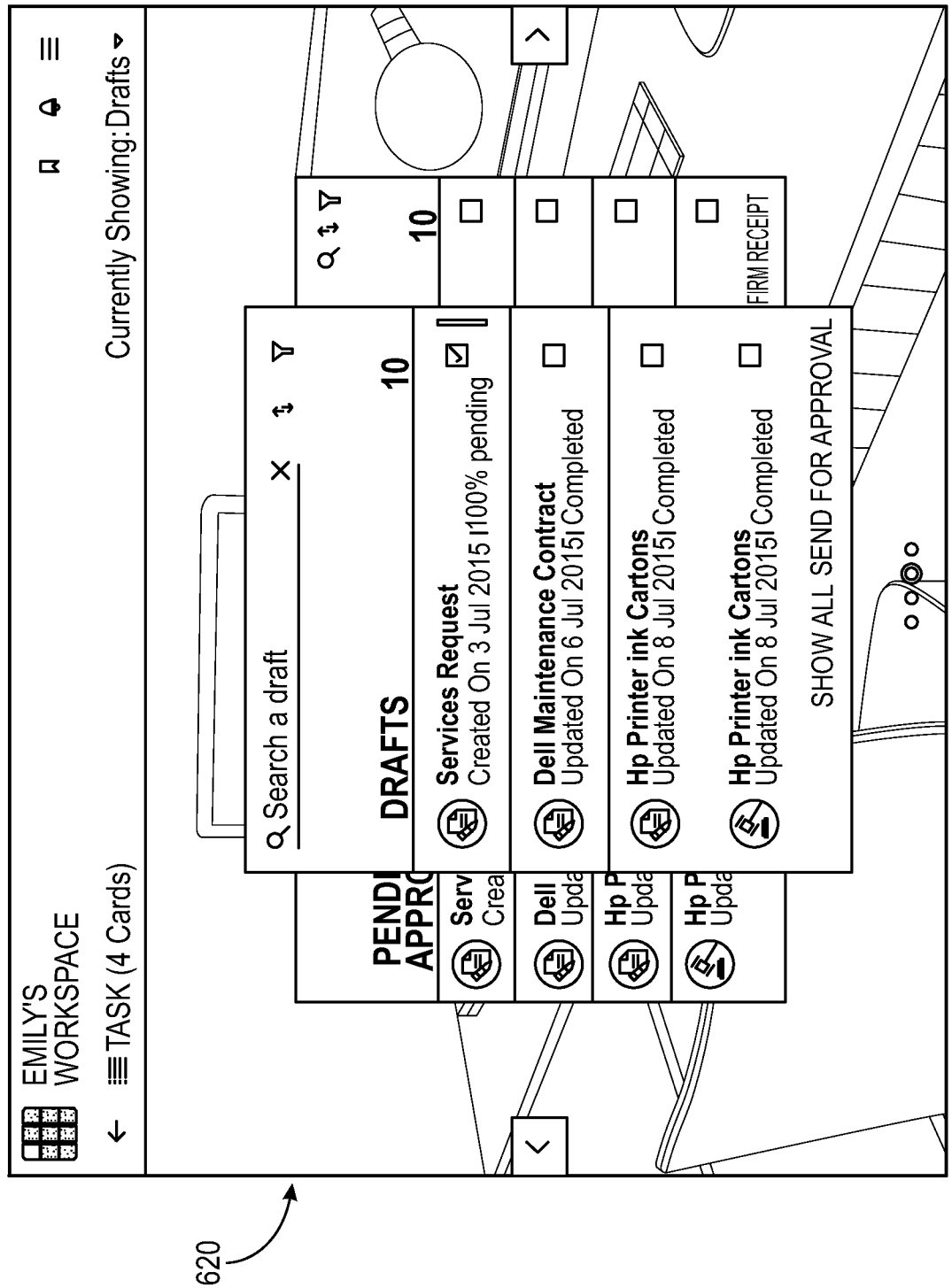

Referring to FIGS. 6A-6C, an activity stamp tool (600, 610, 620) is provided in accordance with an embodiment of the invention. The tool stores a screen state (600) in real time, enabling navigation to the stored screen in a same session and sharing the screen state at any time by an activity stamp tool. The artificial intelligence (AI) engine of the present invention auto-saves data entered by the user and also retains screen states thereby avoiding repeated interactions to enable reduced operational time.

The system of the present invention allows the user to auto-bookmark any activity and create a smart navigation out of it. The activity smart tool is an engine running consistently behind the scenes to not only auto-save the entered data but also retain the screen state (scroll location, opened accordion groups, opened navigation bars, entered data, added form elements, views and filters applied and many more) in which the user left that screen while navigating away from it in the same session. This reduces the number of clicks and the repeated interactions which the user might have already achieved while leaving the screen.

In an embodiment, if a user creates a document regularly, he can bookmark (610) it as shown in FIG. 6B. The bookmarked document is available in the navigation for the user to access it next time by avoiding all the extended screenflows and directly accessing it through a shortcut. Due to use of the persistent state capability of the system, it is ensured that the data entered are retained, thus allowing the user to take breaks in activities and resuming work from where the user left.

In an exemplary embodiment, the tool also provides a bookmark sharing option (620). It is a very helpful in cases where the user for example creates a view on a landing page for seeing a typical type of document for a specific filter. The tool enables the user to not only save this state but also bookmark and share it with other team members so the other team members don't waste time doing the same activity and finding the same documents.

In an embodiment, the users can also mark as favorite a typical type of document card. The tool enables the system to list these cards on the top so they can be found faster.

In another exemplary embodiment, if a user opens a smart nav tool menu on the home screen while navigating from there to the next internal screen, the system remembers the state of the home screen (in this case the menus are open) in which the user left the screen, and when they return to the home screen again the system will keep the smart nav open and scrolled to the items which were last visible.

Figure 7A:
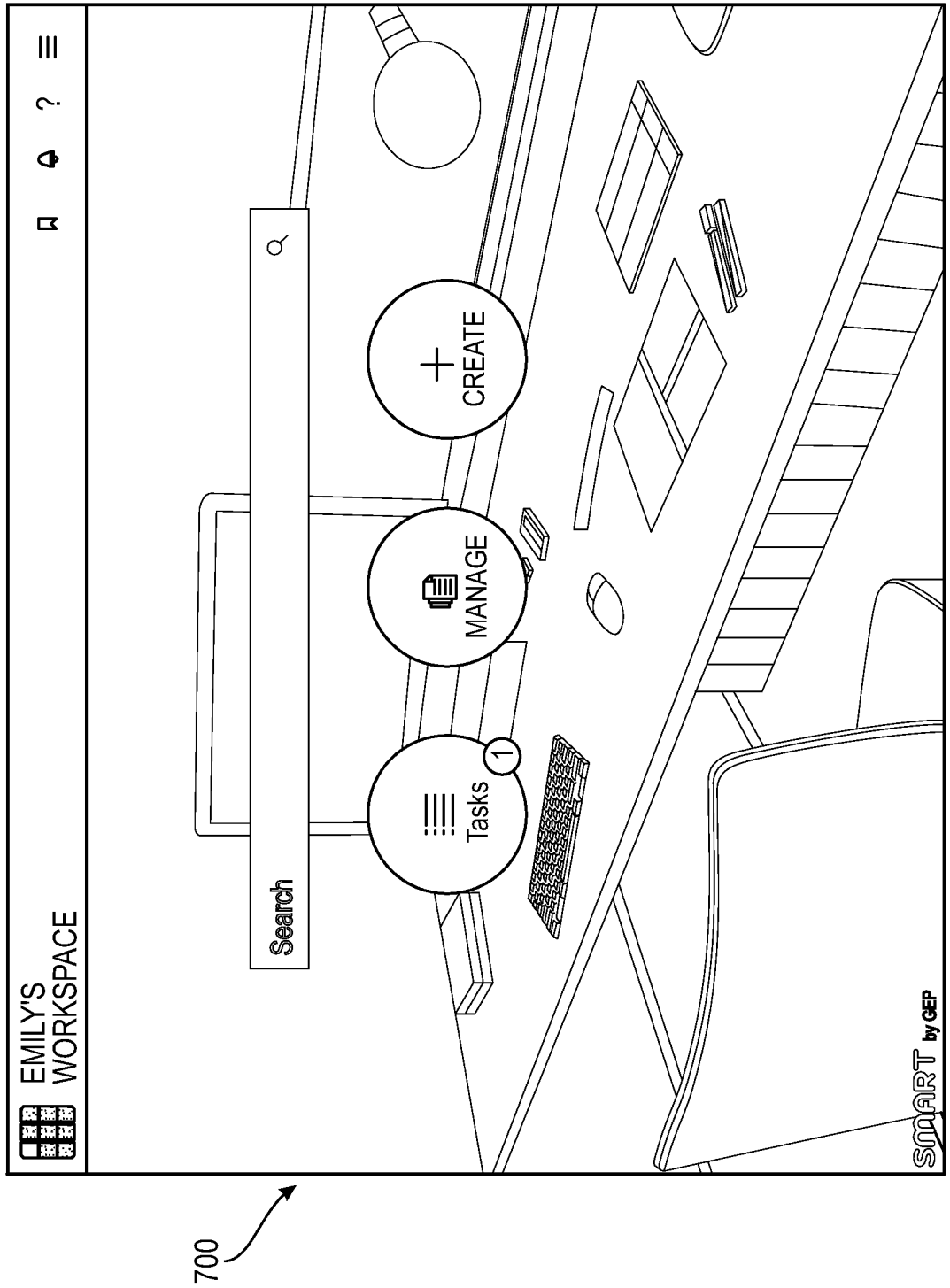
Figure 7B:
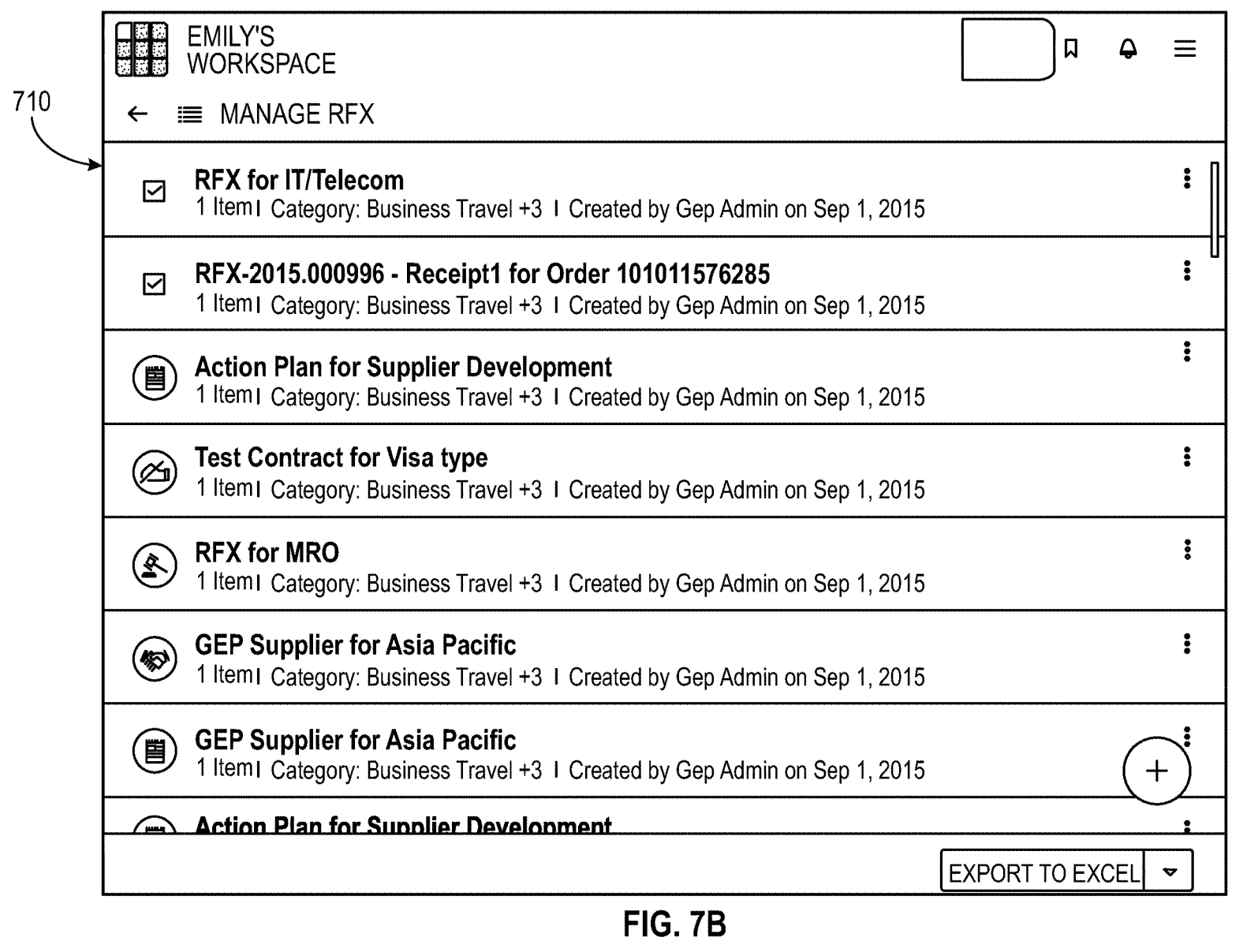

Referring to FIGS. 7A-7B, a One Nav+ tool (700, 710) is provided in accordance with an embodiment of the invention. The tool enables navigating between multiple pages in the workspace with one click using a one click navigation tool working on a hub and spoke mechanism. The navigation in workspace is not deeper than just one click from where it originated. A users starts from a central location, performs a task and can come back to that location from where the user started.

In an exemplary embodiment, for applications relating to procurement such a simple navigation tool (710) is extremely useful to un-complicate the complex systems in the procurement space.

In a related embodiment, the features of the One Nav+ tool includes home screen navigation using single entry points to My Tasks, Manage Documents and Creating Documents, brings the essence of the software to a more task oriented approach. Further, the toll provides global search and narrowed down card based search results, allowing the users to search anything, but in a streamlined fashion that improves upon direct access to on-demand items. The one click navigation tool provides consistent back navigation to take the user back to either the previous screen or directly home by clicking on the workspace logo.

Figure 8A:
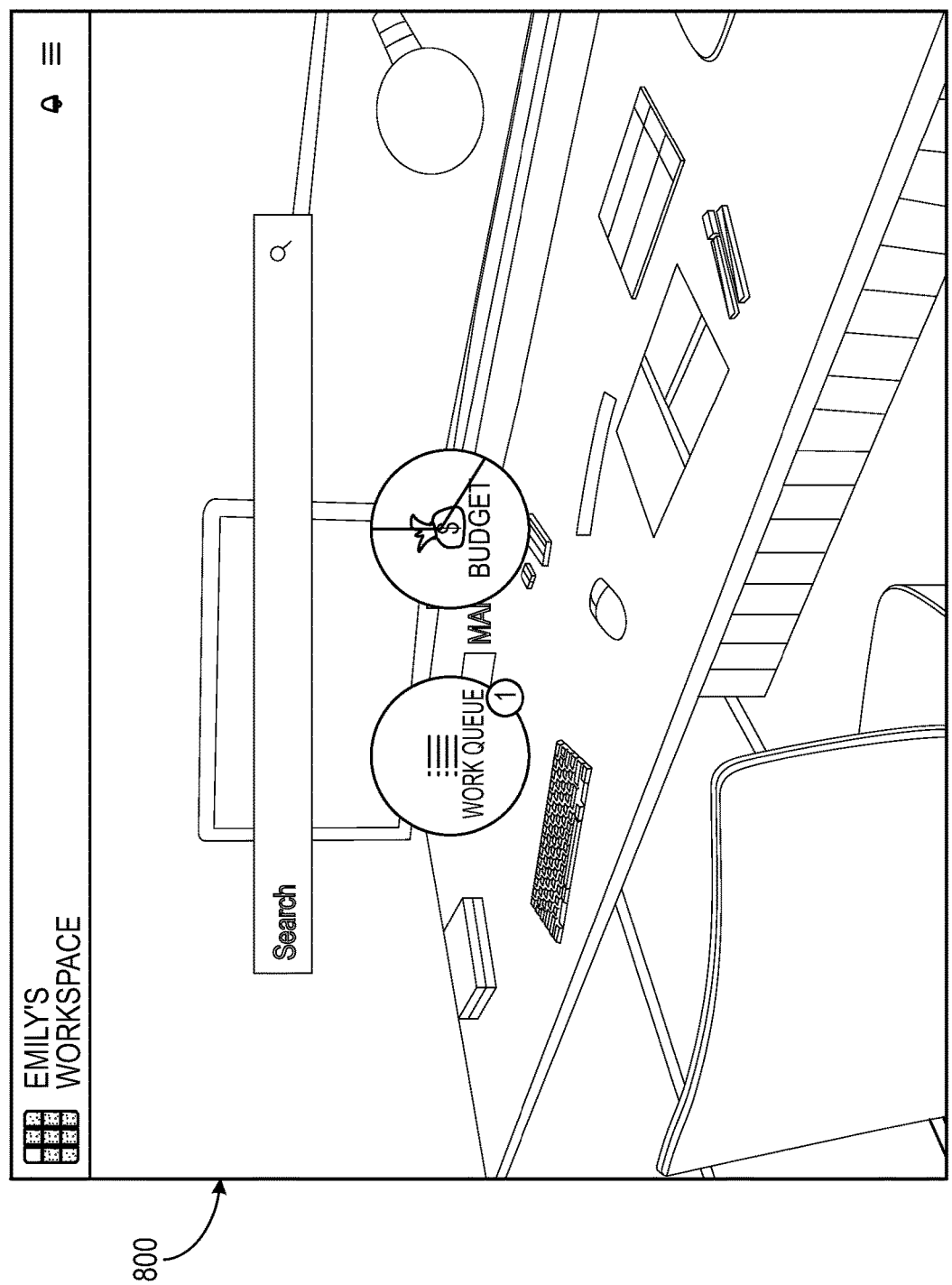
Figure 8B:
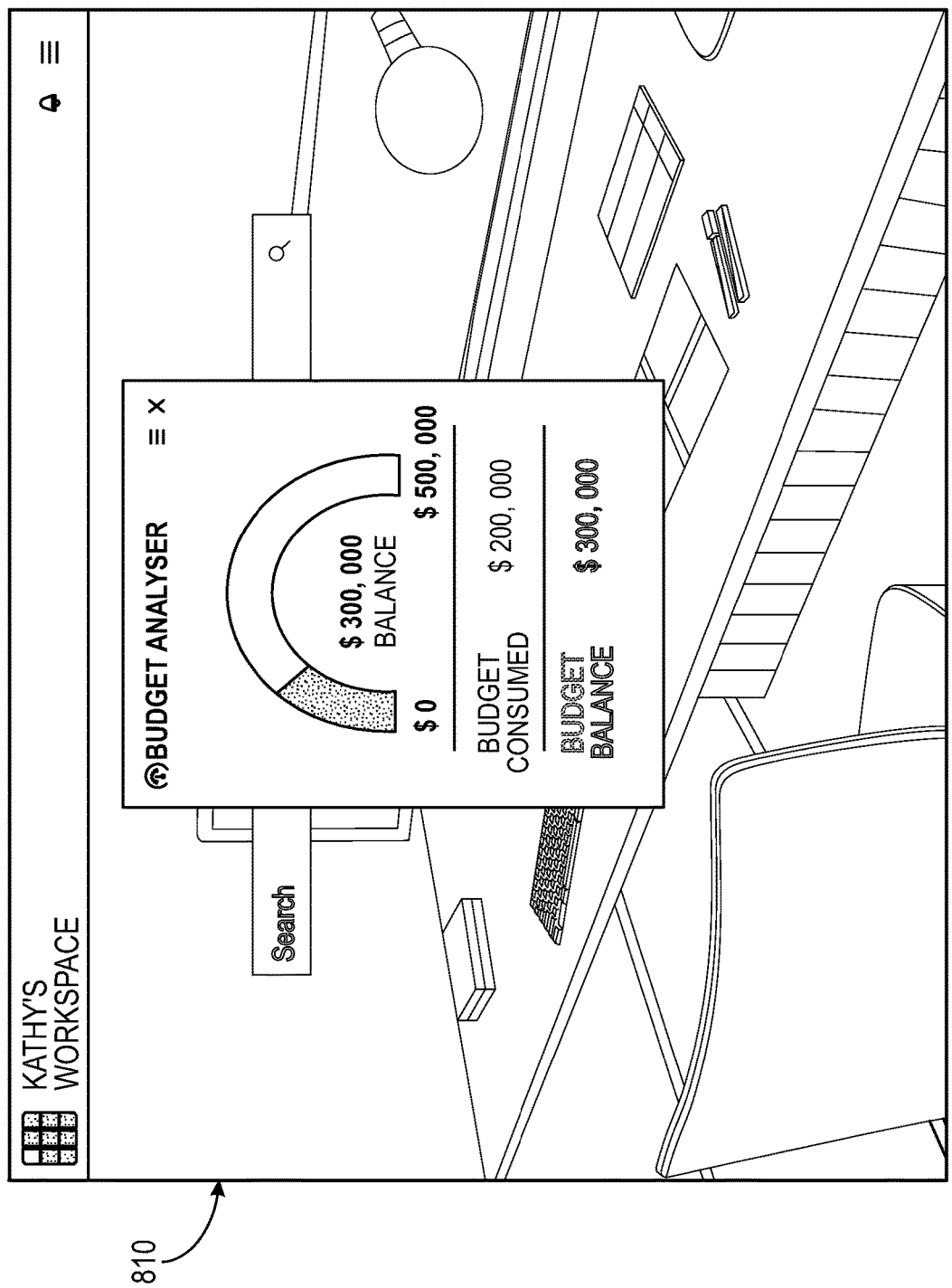
Figure 8C:
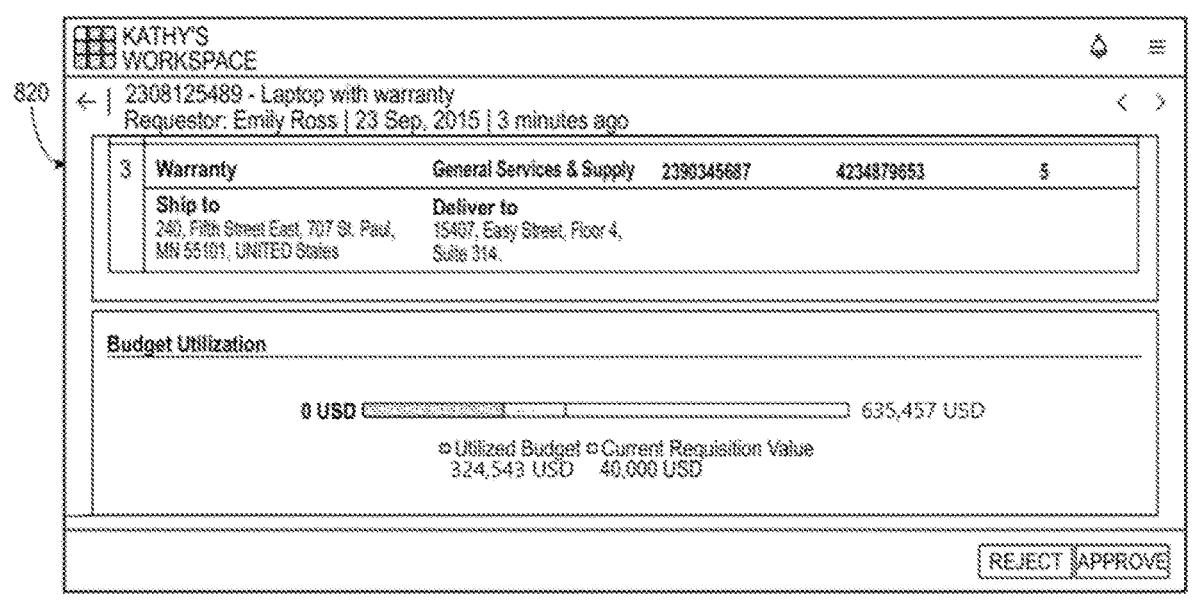

Referring to FIGS. 8A-8C, a just in time analytics cards (JIT A Cards) tool (800, 810, 820) is provided in accordance with an embodiment of the present invention. The JIT A Cards is the analytics engine of the workspace that uses a robust analytics and reporting engine to extract and deliver contextual high value data-points about various cues to the end user say while creating a document using widget forms tool.

In an example embodiment, while creating a document user adds a vendor name in a field, the J-I-T Analytics Engine of the workspace that runs in the background identifies if there is any relevant information available for this vendor that can help the user create this document better. Based on an artificial intelligence (AI) algorithm, the JIT A card tool shows a small icon next to the vendor name, the user clicks on it and in a small card, it shows all relevant data for that vendor for this particular type of document like "total spend value for this vendor is . . . dollar", "You have 5 ongoing contracts with this vendor", "Seems like there is an opportunity available for this vendor", "You rejected this vendor because of a reason in the last RFX", etc. and a view more to take the user right in the middle of the analytics to make a decision right in between the creation process or flag the risk or do specific action. This is a very powerful way of promoting decision making via analytics.

In an advantageous aspect, the J-I-T A Cards are contextual to the relevance, improve with time and usage, are configurable on what needs to be shown by admin, can be extended to any part of the workspace like widget form, are sharable and customizable by the user, and dockable anywhere in the application.

More particularly useful in the procurement application, the J-I-T A card tool provides the way to move away from traditional procurement systems where all such analytical reports are all stacked and tucked away in a separate area for the user to go and find them. Users might visit the reports and see the information, export them or to take relevant reactive measures will have to again navigate out of it and go to other places in the system and take an action. This way the power of these existing analytics are often curbed to only fancy reports. The workspace of the present invention takes analytics to the next level by bringing the analytics right to the place where the user needs them, thus increasing the adoption and usage of this information by leveraging the power of informative decision making at the right moment.

Referring to FIG. 8B, the tool also provides information about budget utilization 810 at the correct instant for enabling the user to make informed decisions in a procurement application. Also, the information regarding the requisitions for a procurement activity along with the status and budget utilization is also provided by the tool 820 for enabling the user to make an informed decision to either reject or approve as shown in FIG. 8C.

In an advantageous aspect, the workspace of the present invention makes user's life easy every time the user works on an application of the system. It uses behavioral analytics and starts tweaking user interactions and promoting frequently used functions/taskflows, thus eliminating the visual noise and providing ultimate usability. The workspace delivers a fluid and flexible experience via embedded analytics throughout the system to track usage behavior.

Figure 9A:
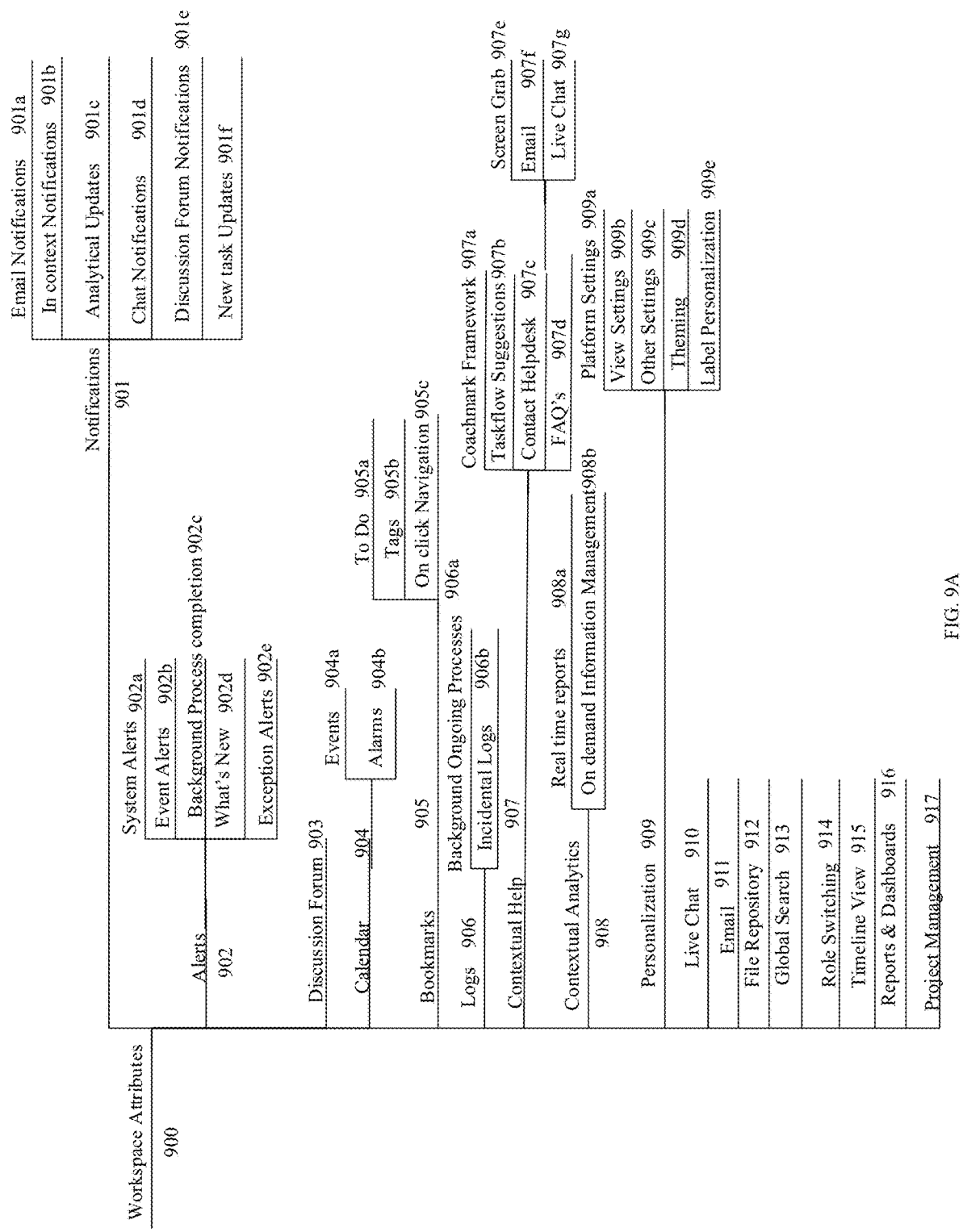
FIGS. 9A-9B are flow diagrams representing workspace attributes and user roles of a procurement system application with objects of the workspace for operating on the application in accordance with an embodiment of the invention.
Figure 9B:
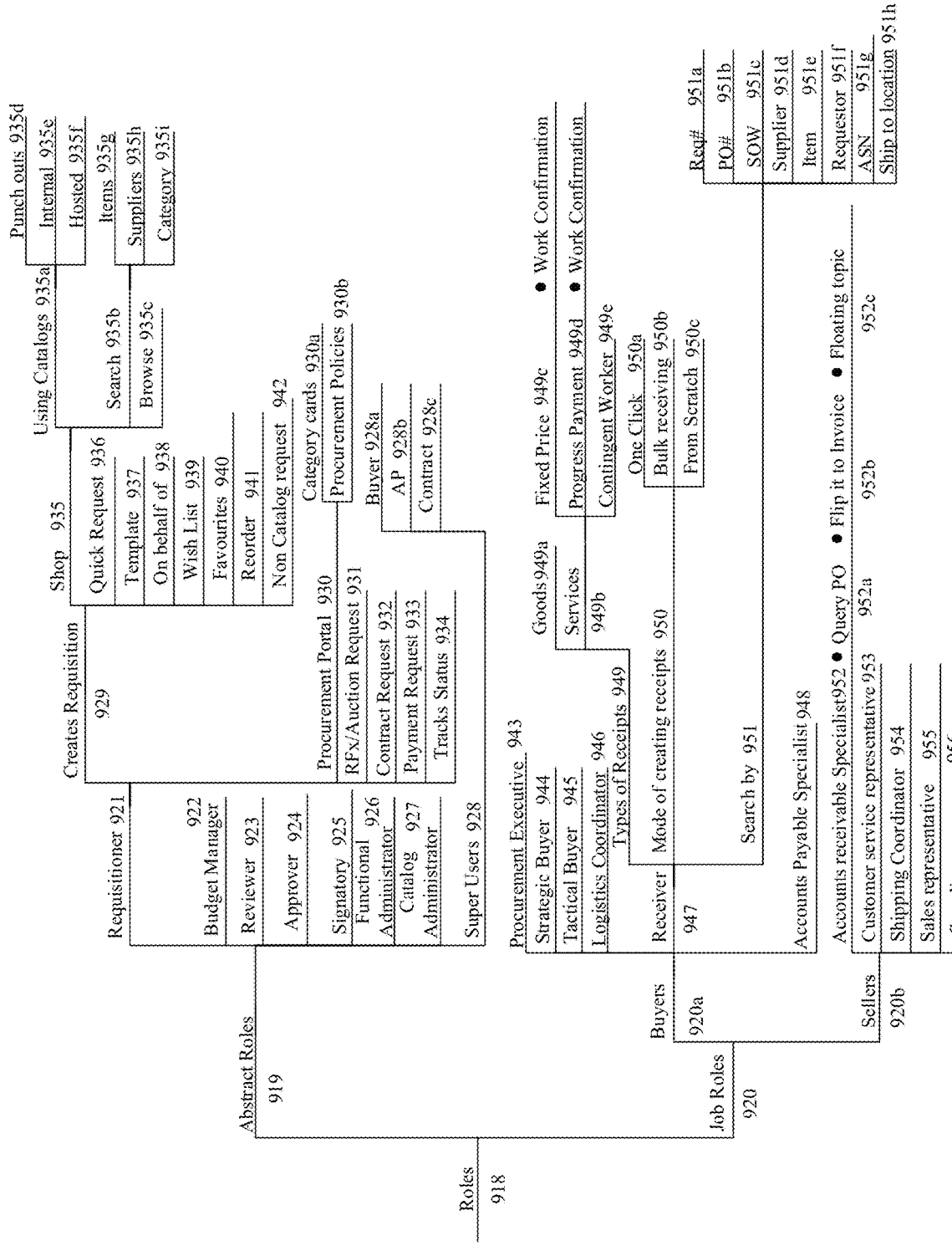

In an example embodiment, the system and method of the present invention operate on a procurement application with the intelligent workspace as shown in FIG. 9A-9B. The procurement activity involves complex task flows, usage pattern, dynamically changing operational challenges and time constraints for executing process tasks. The process tasks in procurements may include managing requisitions, creating purchase orders with line items to be fulfilled by a vendor, automated sending via fax or email, vendor follow up-automated, or reminders to follow up with vendors to confirm purchase orders, receiving of goods or services, maintaining a physical inventory of goods, financial settlement, creating financial and/or inventory related transactions as goods are physically received.

The method of operating on certain parts of a procurement application with the workspace is provided in an example embodiment of the invention herein. It shall be understood that the embodiment is for the purpose of explanation and it is not be construed to limit the invention in any manner. The invention can be practiced on other parts of the procurement applications as well. The workspace being a personalized user space will cater to the user as per his/her role and show her only the tasks she may need to do depending upon the requirement of the organization. Once a user logs into the workspace of a procurement application, coachsmart will get triggered and show the latest things a user may need to focus on like "Pending Tasks" or "Notifications" to name a few. A user can click on the pending tasks hyperlink and he/she would land into the "My Tasks" cards where the user can click on any of the pending tasks to finish them. For example, the user of the procurement application may need to complete a requisition which the user had left half way. The workspace using the "Activity Stamp" object will take the user directly into the draft mode of the requisition with all the data intact and even auto-scroll to the level where the user had left the page last. Since the document creation in the workspace may be done using "Widget Form" tool, the user can quickly finish the creation task with whatever he/she thinks is needed to be filled and add/remove non-required form elements thus making it shorter. All through the user interaction with the workspace, "EvoTerface" which using User's Usage Behavioural Analytics as a feed will use "coachsmart" and communicate to the user that he/she can move around items and functionalities which she is frequently using and remove elements which are not very frequently used, thus evolving the interface to exactly suit the user's need and style of working, giving her a personalized experience.

In a procurement application, while creating the requisition, one of the required actions is to add line items which the user fetches from a catalog. Once the item appears on the screen and the supplier name is auto-filled, a small icon appears next to the Supplier Name. This indicator is from the J-I-T A Cards engine, which uses the procurement applications robust analytics and fetches all information related to this supplier that the user has just chosen. On click, the user can see in a small card the information related to the supplier and also access further analytics which can at runtime enable the user to make a decision. The information fetched can have output like past requisitions pending with this supplier, any ongoing contracts, so on and so forth.

A user can at any point in time use the One Nav+ Navigation system to reach the home screen of the procurement application just by one click. The user can then click on the create button to access the smart nav, which will be customized using the workspace's AI engine to show documents that the user is frequently creating. The user can also further customize the smart nav ribbon by dragging and dropping items as per his/her need. Coachsmart gets triggered at regular intervals to make recommendations to the user on how to personalize the navigation ribbon which is smart nav and make it suitable for quick access. At any point within the workspace, the user can bookmark a page and add it to her consistent navigation to use it as a shortcut.

Referring to FIG. 9A, the procurement system of the present invention includes workspace attributes 900. The workspace attributes 900 include objects like notifications 901, alerts 902, discussion forum 903, calendar 904, bookmark 905, logs 906, contextual help on procurement 907, contextual analytics 908, personalization 909, live chat 910, email 911, file repository 912, global search 913, role switching options 914, timeline view 915, reports & dashboards 916 and procurement project management 917.

In a related embodiment, notifications 901 may include emails notifications 901a, in-context notifications 901b, analytic updates 901c, chat notifications 901d, discussion forum notifications 901e, and new task updates 901f The alerts 902 relating to procurement activity may include system alerts for procurement activity 902a, event alerts 902b, background process completion 902c, what's new 902d, and exception alerts 902e. Further, calendar 904 may include events 904a and alarms 904b. The bookmark 905 object includes to do 905a, tags 905b, one click navigation 905c. Also, the logs 906 may include background ongoing processes 906a and incidental logs 906b.

In an exemplary embodiment, the contextual help object 907 of the workspace includes coach mark framework 907a, taskflow suggestions 907b, contact helpdesk option 907c providing screen grab 907e, email 907f and live chat options 907g, FAQs 907d.

In an embodiment, the contextual analytics 908 may include real time procurement reports 908a and on demand procurement information management 908b.

In another related embodiment, the personalization object 909 may include platform settings 909a, view settings 909b, other settings 909c, theming 909d and label personalization options 909e.

In an embodiment, the user profile/role 918 includes abstract roles 919 and Job roles 920 as shown in FIG. 9B. The abstract roles 919 include requestor 921, budget manager 922, reviewer 923, approver 924, signatory 925, functional administrator 926, catalog administrator 927 and super users 928.

In a related embodiment, the requestor 921 includes creating requisition 929, a procurement portal 930 providing category card 930a and procurement policies 930b, RFx/auction request 931, contract request 932, payment request 933, and tracking status 934. The creation of requisition 929 includes shopping 935 using catalog 935a like punch-outs 935d, internal 935e or hosted 935f; search 935b by items 935g, suppliers 935h or category 935i, and browse option 935c. The creating requisition 929 further includes quick request 936, template 937, on behalf of 938, wishlist 939, favorites 940, reorder 941, and non-catalog requests 942.

In another related embodiment, the super users 928 include a buyer 928a, AP 928b or contract 928c.

In an embodiment the job roles 920 include buyers 920a and suppliers 920b. The buyers 920a include procurement executives 943, strategic buyers 944, tactical buyers 945, logistics coordinators 946, receivers 947, and accounts payable specialists 948.

In a related embodiment, the receiver 947 includes type of receipts 949, i.e., goods 949a or services 949b. In case of services 949b, including fixed price 949c, progress payment 949d and contingent worker options 949e. The receiver 947 further provides mode of creating receipts 950 like one click 950a, bulk receiving 950b or from scratch 950c. The receiver 947 also includes search 951 by options like Req #951a, PO #951b, SOW 951c, supplier 951d, item 951e, requestor 951f, ASN 951g, and ship to location 951h.

In another related embodiment the sellers 920b include account receivable specialist 952 with query PO 952a, flip it to invoice 952b and floating topic options 952c. The sellers 920b further include customer service representative options 953, shipping coordinator 954, sales representatives 955 and supplier options 956.

In an exemplary embodiment, the complex nature of operating on objects of the procurement applications requires the intelligent workspace to execute tasks with reduced operation time as provided by the present invention.

In an exemplary embodiment, the present invention may be a system, a method, and/or a computer program product. The computer program product may include a computer readable storage medium (or media) having computer readable program instructions thereon for causing a self-learning processor to carry out aspects of the present invention. The computer readable storage medium (or media) has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device, i.e., it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to which falls within the scope of the appended claims.

What is claimed is:

1. An electronic user interface system with a workspace for operating on a procurement application of a computing device, the system comprising:
    a network interface configured to communicate with at least one server;
    an electronic user interface configured to display the workspace on the computing device and receive inputs from a user;
    at least one user activity database coupled to the at least one server for storing real-time user activity data obtained by identifying and tracking activity of the user in the workspace;
    at least one user profile database coupled to the at least one server for storing user profile data containing information about access, terms of usage and role of the user when operating on the procurement application;
    a hardware processor; and
    a memory containing computer-readable instructions that, when executed by the hardware processor, cause the hardware processor to perform operations comprising:
    predicting, by a self-learning data processor, a set of actions based on dynamically changing user behavior data, the user activity data and the user profile data,
    dynamically reconfiguring, by the self-learning data processor, the workspace for enabling the user to operate on the procurement application, wherein the workspace is reconfigured in real-time based on a dynamically predicted and auto-selected workflow, wherein the auto-selected workflow provides a plurality of optimization and navigation options to the user based on the predicted set of actions, and
    running, by the self-learning data processor, the procurement application based on the dynamically reconfigured workspace,
    wherein the self-learning data processor is configured to process the predicted set of actions and a plurality of auto-selected real-time optimization and navigation options,
    wherein, at the at least one server, the real-time user activity data are mapped with the user profile data to correlate a requirement of the user and a behavioral pattern of the user including generating recommended user preferred locations on the electronic user interface by analyzing, in real-time, the predicted set of actions by the user on the electronic user interface as part of the real-time user activity data based on a data reciprocity developed among the self-learning data processor, the workspace, the at least one user activity database and the at least one user profile database for dynamically reconfiguring the workspace with the auto selected workflow in real-time, and
    wherein the self-learning data processor is configured to at least one of present a graphic control element with a configured dialog, perform at least one action with one click, provide form elements for data entry, mark a screen as favorite and inquire whether the user wants to revisit the screen marked as favorite and, if the user indicates that the user wants to revisit the screen marked as favorite, then revisit the screen marked as favorite.

2. The system of claim 1, wherein the self-learning data processor is configured to reconfigure a navigation page of the procurement application based on the real-time user activity data and the user profile data.

3. The system of claim 1, wherein the self-learning data processor is configured for on-demand data entry, wherein a data form is formulated into widgets having meta-data attached.

4. The system of claim 1, wherein the electronic user interface is a self-evolving user interface configured to receive inputs from the user through voice commands, gesture controls, mice, touch pads or keyboards.

5. The system of claim 1, wherein the self-learning data processor is configured to store a screen state in real-time, enabling navigation to a stored screen in a same session, and the self-learning data processor is further configured to share the screen state at any time, wherein the self-learning data processor auto-saves data entered by the user and also retains the screen state, thereby avoiding repeated interactions.

6. The system of claim 1, wherein the workspace identifies and suggests information about the inputs received from the user thereby providing analysis as per needs of the user through the electronic user interface.

7. The system of claim 1, wherein the self-learning data processor is configured for navigating among multiple pages in the workspace with one click.

8. The system of claim 1, wherein the real-time user activity data include information about user navigation when operating on the procurement application, recurring user navigation data, user behavioral pattern data, time spent on a particular tool of the workspace by the user, visited locations on the electronic interface by the user, and preferred mode of inputting data.

9. The system of claim 1, wherein the computing device is a computer, a mobile device, tablet, or a smart watch.

10. The system of claim 1, wherein the at least one server is a dedicated server or a cloud server.

11. The system of claim 1, wherein the user activity data and behavior data are tracked at a back end for processing location coordinates on the electronic user interface and access tools based on positions of the access tools on the electronic user interface for operating on the procurement application.

12. The system of claim 1, wherein the self-learning data processor is configured to process the user activity data and map the user activity data with the user profile data to correlate a requirement of the user and a behavioral pattern of the user for dynamically reconfiguring the workspace.

13. An electronic user interface system with a workspace for operating on a procurement application of a computing device, the system comprising:
 a network interface configured to communicate with at least one server;
 an electronic user interface configured to display the workspace on the computing device and receive inputs from a user;
 at least one user activity database coupled to the at least one server for storing real-time user activity data obtained by identifying and tracking activity of the user in the workspace of the procurement application;
 at least one user profile database coupled to the at least one server for storing user profile data containing information about access, terms of usage and role of the user when operating on the procurement application;
 a hardware processor; and
 a memory containing computer-readable instructions that, when executed by the hardware processor, cause the hardware processor to perform operations comprising:
 predicting, by a self-learning data processor, a set of actions based on dynamically changing user behavior data, the real-time user activity data and the user profile data while operating on the procurement application,
 dynamically reconfiguring, by the self-learning data processor, the workspace for enabling the user to operate on the procurement application,
  wherein the workspace is reconfigured in real-time based on a dynamically predicted and auto-selected workflow,
  wherein the auto-selected workflow in the procurement application provides a plurality of auto-selected real-time optimization and navigation options to the user based on the predicted set of actions while operating on the procurement application,
 running, by the self-learning data processor, the procurement application based on the dynamically reconfigured workspace,
  wherein the self-learning data processor is configured to process the predicted set of actions and the plurality of auto-selected real-time optimization and navigation options,
  wherein, at the at least one server, the real-time user activity data while operating on the procurement application are mapped with the user profile data to correlate a requirement of the user and a behavioral pattern of the user including generating recommended user preferred locations on the workspace by analyzing, in real-time, the predicted set of actions by the user on the workspace as part of the real-time user activity data based on a data reciprocity developed among the workspace, the at least one user activity database and the at least one user profile database for dynamically reconfiguring the workspace with the auto selected workflow in the procurement application in real-time,
  wherein the self-learning data processor identifies custom tags on the dynamically reconfigured workspace by a spider-crawl algorithm to generate a graphic control element (GCE) screen for displaying help information about a plurality of items appearing randomly in the procurement application, and
  wherein the help information is fetched from a help database.

14. A method for operating with a workspace on a procurement application of a computing device, the method comprising the steps of:
 displaying the workspace on a display of the computing device;
 receiving inputs from a user through an electronic user interface;
 tracking activity of the user in the workspace to identify and store real-time user activity data in at least one user activity database;
 fetching a-user profile data from at least one user profile database, wherein the user profile data provide information about access, terms of usage and role of the user when operating on the procurement application;
 predicting, by a self-learning data processor, a set of actions based on user behavioral data, the real-time user activity data, and the user profile data; and
 dynamically reconfiguring the workspace for enabling a-the user to operate on the procurement application,
  wherein the workspace is reconfigured in real time on a dynamically predicted and auto-selected workflow,
  wherein the auto-selected workflow provides a plurality of optimization and navigation options to the user based on the predicted set of actions, and
  wherein the self-learning data processor runs the procurement application with the reconfigured workspace to process the predicted set of actions and the plurality of optimization and navigation options; and
 mapping, at a server, the real-time user activity data with the user profile data to correlate a requirement of the user and a behavioral pattern of the user including generating, by the self-learning data processor, recommended user preferred locations on the electronic user interface by analyzing, in real-time, the predicted set of actions by the user on the electronic user interface as part of the real-time user activity data based on a data reciprocity developed among the workspace, the at least one user activity database and the at least one user profile database for dynamically reconfiguring the workspace with the auto-selected workflow in real time,
 wherein the self-learning data processor is configured to at least one of present a graphic control element with a configured dialog, perform at least one action with one click, provide form elements for data entry, mark a screen as favorite and inquire whether the user wants to revisit a screen and, if the user indicates that the user wants to revisit the screen marked as favorite, revisit the screen marked as favorite.

15. The method of claim 14, wherein the plurality of optimization and navigation options are either auto selected by the self-learning data processor or selected by the user or selected by both the self-learning data processor and the user.

16. The method of claim 14, wherein the self-learning data processor is configured to execute the step of:
reconfiguring a navigation page of the procurement application based on the real-time user activity data.

17. The method of claim 14, wherein the self-learning data processor is configured to execute the step of:
facilitating on-demand data entry based on the real-time user activity data, wherein a data form is formulated into widgets having meta-data attached.

18. The method of claim 14, wherein the self-learning data processor executes the step of:
tracking the user's usage, visited locations on the electronic user interface by the user, and paths to reach a particular activity point.

19. The method of claim 18, wherein the visited locations on the electronic user interface provide information about the user's preferred locations on the electronic user interface prior to the workspace being reconfigured for operating with a tool of the workspace.

20. The method of claim 18, wherein the plurality of optimization and navigation options include options of creating shortcuts within the workspace, decluttering the workspace by removing or reshuffling un-used functionalities from the user's preferred locations on the electronic user interface, and prioritizing information cards, actions and navigational elements for finding at least one of the un-used functionalities, information cards, and actions next time.

21. The method of claim 14, wherein the self-learning data processor is configured to execute the step of:
storing a screen state in real time enabling navigation to the stored screen state in a same session and sharing the stored screen state at any time,
wherein the self-learning data processor auto-saves data entered by the user and also retains the screen state, thereby avoiding repeated interactions.

22. The method of claim 14, wherein the self-learning data processor is configured to execute the step of:
identifying and suggesting information about an input received from the user to provide analysis as per needs of the user through the electronic user interface.

23. The method of claim 14, wherein the self-learning data processor is configured to execute the step of:
navigating between multiple pages in the workspace with one click using a one click navigation tool working on a hub and spoke mechanism.

24. A method for operating with a workspace on a procurement application of a computing device, the method comprising the steps of:
displaying the workspace on a display of the computing device;
receiving inputs from a user through an electronic user interface;
tracking activity of the user in the workspace to identify and store real-time user activity data while operating on the procurement application in at least one user activity database;
fetching user profile data from a user profile database wherein the user profile data provides information about access, terms of usage and role of the user when operating on the procurement application;
predicting by a self-learning data processor a set of actions based on user behavioral data, the real-time user activity data and the user profile data; and
dynamically reconfiguring the workspace for enabling the user to operate on the procurement application, wherein the workspace is reconfigured in real time on a dynamically predicted and auto-selected workflow in the procurement application, wherein the auto-selected workflow provides a plurality of optimization and navigation options to the user based on the predicted set of actions, wherein the self-learning data processor runs the procurement application with the reconfigured workspace to process the predicted set of actions and the plurality of optimization and navigation options, wherein the plurality of optimization and navigation options include a coach smart tool, a one-click navigation tool, a widget tool, and an activity stamp tool; and
mapping at a server, the real-time user activity data with the user profile data in the procurement application to correlate a requirement of the user and a behavioral pattern of the user including generating by the self-learning data processor, recommended user preferred locations on the electronic user interface by analyzing in real-time, the predicted set of actions on the electronic user interface as part of the real-time user activity data while operating in the procurement application based on a data reciprocity developed among the workspace, the at least one user activity database and the user profile database for dynamically reconfiguring the workspace with the auto selected workflow in the procurement application in real time,
wherein the reconfigured workspace enables the self-learning data processor to execute the step of: displaying help information about a plurality of items appearing randomly in the procurement application, wherein the self-learning data processor identifies custom tags on the dynamically reconfigured workspace by a spider-crawl algorithm to generate a graphic control element to display the help information integrated in the procurement application.

25. The method of claim 24, wherein displaying the in-context help information comprises the steps of:
creating at least one custom identifier;
appending the at least one custom identifier to at least one selected floating screen item;
displaying a plurality of screen items on a display screen of the user;
scanning the plurality of displayed screen items for identifying the at least one selected floating screen item and the at least one custom identifier, wherein the at least one floating screen item can be identified even if the at least one floating screen item appears randomly on any display screen at any part of the procurement application;
processing information associated with the at least one custom identifier by the self-learning data processor;
loading a graphic control element (GCE) screen on top of the display screen; and
displaying the information associated with the at least one custom identifier on the GCE screen as the help information.

26. The method of claim 25, wherein the self-learning data processor is configured to process an identifier associated with the at least one floating screen item in the help database for identifying the at least one floating screen item on any display screen at any stage of use and fetch the custom identifier information for displaying on a GCE screen, wherein the GCE screen is translucent.

27. A computer program product for operating with a workspace on an application of a computing device with memory, the product comprising:
  a computer readable storage medium readable by a self-learning data processor and storing instructions for execution by the self-learning data processor for performing a method, the method comprising:
    displaying the workspace on a display of the computing device;
    receiving inputs from a user through an electronic user interface;
    tracking activity of the user in the workspace to identify and store real-time user activity data in at least one user activity database;
    fetching user profile data from a user profile database, wherein the user profile data provide information about access, terms of usage and role of the user when operating on the application;
    predicting, by the self-learning data processor, a set of actions based on user behavior data, the real-time user activity data and the user profile data; and
    dynamically reconfiguring the workspace for enabling a-the user to operate on the application,
      wherein the workspace is reconfigured in real-time based on a dynamically predicted and auto-selected workflow,
      wherein the auto-selected workflow provides a plurality of optimization and navigation options to the user based on the predicted set of actions thereby enabling the reconfigured workspace to display in-context help information about a plurality of items appearing randomly in the application,
      wherein a graphic control displays the in-context help information integrated in the application; reconfigure a navigation page of the application based on the real-time user activity data, and enable on-demand data entry based on the real-time user activity data,
      wherein a data form is formulated into widgets having meta-data attached, and
      wherein the self-learning data processor is configured to run the application with the reconfigured workspace to process the predicted set of actions and the plurality of optimization and navigation options; and
    mapping, at a server, the real-time user activity data with the user profile data to correlate a requirement of the user and a behavioral pattern of the user including generating, by the self-learning data processor, recommended user preferred locations on the electronic user interface by analyzing, in real-time, the predicted set of actions by the user on the electronic user interface as part of the real-time user activity data based on a data reciprocity developed among the self-learning data processor, the workspace, the at least one user activity database and the user profile database for dynamically reconfiguring the workspace with the auto selected workflow in real-time,
      wherein the self-learning data processor is configured to at least one of present a graphic control element with a configured dialog, perform at least one action with one click, provide form elements for data entry, mark a screen as favorite and inquire whether the user wants to revisit the screen marked as favorite and, if the user indicates that the user wants to revisit the screen marked as favorite, then revisit the screen marked as favorite.

28. The computer program product of claim 27, wherein the self-learning data processor is configured to execute a step of:
  identifying and suggesting information about the inputs received from the user, wherein the information is provided by the self-learning data processor to provide analysis as per needs of the user through the electronic user interface.

29. The computer program product of claim 27, wherein the self-learning data processor is configured to execute a step of:
  storing a screen state in real-time enabling navigation to the stored screen state in a same session and sharing the stored screen state within the application at any time, wherein the self-learning data processor auto-saves data entered by the user and also retains the stored screen state thereby avoiding repeated interactions.

* * * * *